US010127514B2

(12) United States Patent
Napoli

(10) Patent No.: US 10,127,514 B2
(45) Date of Patent: Nov. 13, 2018

(54) DYNAMIC CUBBY LOGIC

(71) Applicant: INTELLIGRATED HEADQUARTERS LLC, Mason, OH (US)

(72) Inventor: Daniel Raymond Napoli, Bedford Corners, NY (US)

(73) Assignee: Intelligrated Headquarters LLC, Mason, OH (US)

( * ) Notice: Subject to any disclaimer, the term of this patent is extended or adjusted under 35 U.S.C. 154(b) by 1159 days.

(21) Appl. No.: 14/251,077

(22) Filed: Apr. 11, 2014

(65) Prior Publication Data
US 2015/0294260 A1 Oct. 15, 2015

(51) Int. Cl.
*G06Q 10/08* (2012.01)

(52) U.S. Cl.
CPC ......... *G06Q 10/083* (2013.01); *G06Q 10/087* (2013.01)

(58) Field of Classification Search
CPC ........................... G06Q 10/083; G06Q 10/087
See application file for complete search history.

(56) References Cited

U.S. PATENT DOCUMENTS

| | | | | |
|---|---|---|---|---|
| 3,908,800 A * | 9/1975 | Drapeau | ............... | B65G 1/1375 186/56 |
| 5,434,394 A * | 7/1995 | Roach | ..................... | A47F 9/046 235/375 |
| 5,468,110 A * | 11/1995 | McDonald | ........... | B65G 1/1371 414/268 |
| 5,794,789 A * | 8/1998 | Payson | ..................... | B07C 3/00 209/549 |
| 5,812,986 A * | 9/1998 | Danelski | ................. | G06F 3/147 705/22 |
| 5,875,434 A * | 2/1999 | Matsuoka | ............ | B65G 1/1376 235/385 |
| 6,011,998 A * | 1/2000 | Lichti | .................. | B65G 1/1376 414/268 |
| 6,193,160 B1 * | 2/2001 | Zembitski | .......... | G06K 7/10881 235/383 |
| 6,289,260 B1 * | 9/2001 | Bradley | ............... | B65G 1/1373 414/273 |

(Continued)

OTHER PUBLICATIONS

Chenying Kong "Methods for Design and Management of a Fast-Pick Area in a Warehouse", published on in 2008 in Proceedings of the 2008 Industrial Engineering Research Conference, all pages. (Year: 2008).*

*Primary Examiner* — Michael P Harrington
*Assistant Examiner* — Omar Zeroual
(74) *Attorney, Agent, or Firm* — Alston & Bird LLP

(57) ABSTRACT

Systems, methods, devices, and non-transitory media of the various embodiments provide dynamic cubby logic that enables cubbies of a put wall to be assigned to orders as items for the orders are received at the put wall. In an embodiment, batches or waves of orders may be generated and released without cubbies of a put wall assigned to the orders. As the first item for an order is detected at the put wall a cubby from the available cubbies of the put wall may be selected for the order and all items of the order may be assigned the selected cubby. The cubby may be selected from the available cubbies based at least in part on a priority among the cubbies of the put wall.

33 Claims, 13 Drawing Sheets

(56) References Cited

U.S. PATENT DOCUMENTS

| | | | | |
|---|---|---|---|---|
| 6,505,093 | B1* | 1/2003 | Thatcher | B65G 1/1376 700/214 |
| 6,543,983 | B1* | 4/2003 | Felder | B23Q 7/10 414/331.07 |
| 6,622,127 | B1* | 9/2003 | Klots | G06F 17/30902 705/22 |
| 6,762,681 | B1* | 7/2004 | Danelski | B65G 1/137 340/5.2 |
| 7,031,801 | B1* | 4/2006 | Hodge | B65G 1/137 700/213 |
| 7,110,855 | B2* | 9/2006 | Leishman | G06Q 10/087 700/214 |
| 7,139,637 | B1* | 11/2006 | Waddington | G06Q 10/04 700/216 |
| 7,158,856 | B2* | 1/2007 | Sheehan | G05B 19/4182 340/517 |
| 7,243,001 | B2* | 7/2007 | Janert | G06Q 10/08 700/213 |
| 7,331,471 | B1* | 2/2008 | Shakes | B07C 7/005 209/559 |
| 7,363,104 | B2* | 4/2008 | Stevens | A47B 53/00 700/213 |
| 7,536,321 | B2* | 5/2009 | Takahashi | G06Q 10/063 705/330 |
| 7,894,933 | B2* | 2/2011 | Mountz | G06Q 10/087 700/214 |
| 7,984,809 | B1* | 7/2011 | Ramey | B07C 7/02 198/347.1 |
| 8,073,562 | B2* | 12/2011 | Danelski | B65G 1/137 70/215 |
| 8,103,377 | B1* | 1/2012 | Wong | G06Q 10/087 700/214 |
| 8,165,929 | B2* | 4/2012 | Chudy | G06F 19/3462 705/28 |
| 8,225,034 | B1* | 7/2012 | Golla | G06F 12/0893 711/109 |
| 8,234,006 | B1* | 7/2012 | Sachar | G06Q 10/087 700/214 |
| 8,560,114 | B2* | 10/2013 | Suess | B65G 1/137 700/216 |
| 8,560,407 | B2* | 10/2013 | Buonagurio | G06Q 10/087 235/385 |
| 8,571,915 | B1* | 10/2013 | Wong | G06Q 10/06 705/7.26 |
| 8,965,562 | B1* | 2/2015 | Wurman | G06Q 10/087 235/385 |
| 8,972,043 | B2* | 3/2015 | Foster | G06Q 30/06 186/62 |
| 9,171,278 | B1* | 10/2015 | Kong | G06Q 10/087 |
| 9,280,757 | B2* | 3/2016 | Parpia | G06Q 10/087 |
| 9,382,068 | B1* | 7/2016 | Quan | G06Q 10/08 |
| 9,451,674 | B1* | 9/2016 | Kong | H05B 37/029 |
| 9,466,046 | B1* | 10/2016 | Theobald | G06Q 10/06 |
| 9,505,554 | B1* | 11/2016 | Kong | H04N 5/23212 |
| 9,555,978 | B1* | 1/2017 | Hanssen | B65G 1/1378 |
| 9,637,310 | B1* | 5/2017 | Zou | G05D 1/0297 |
| 2002/0092801 | A1* | 7/2002 | Dominguez | B07C 5/3412 209/583 |
| 2002/0115341 | A1* | 8/2002 | Hein | H01R 25/14 439/495 |
| 2002/0169698 | A1* | 11/2002 | Chien | G06Q 10/087 705/28 |
| 2003/0009396 | A1* | 1/2003 | DeVries | G06Q 10/04 705/28 |
| 2003/0233165 | A1* | 12/2003 | Hein | G06Q 10/087 700/216 |
| 2004/0068443 | A1* | 4/2004 | Hopson | G06Q 10/02 705/5 |
| 2004/0088229 | A1* | 5/2004 | Xu | B65G 1/137 705/28 |
| 2004/0153207 | A1* | 8/2004 | Peck | B65G 1/137 700/214 |
| 2004/0153379 | A1* | 8/2004 | Joyce | G06Q 10/08 705/28 |
| 2004/0238326 | A1* | 12/2004 | Lichti | B65G 1/127 198/475.1 |
| 2005/0102203 | A1* | 5/2005 | Keong | G06Q 10/087 705/28 |
| 2006/0020366 | A1* | 1/2006 | Bloom | B07C 3/00 700/226 |
| 2006/0059049 | A1* | 3/2006 | Morris | G06Q 30/02 705/26.1 |
| 2006/0131379 | A1* | 6/2006 | Aoki | G06Q 10/08 235/376 |
| 2006/0182543 | A1* | 8/2006 | Schaefer | B65G 1/137 414/222.01 |
| 2006/0235557 | A1* | 10/2006 | Knight | G06Q 10/087 700/103 |
| 2007/0050080 | A1* | 3/2007 | Peck | B65G 1/137 700/214 |
| 2007/0136152 | A1* | 6/2007 | Dunsker | G06Q 10/08 705/28 |
| 2007/0150383 | A1* | 6/2007 | Shakes | G06Q 10/087 705/29 |
| 2007/0288306 | A1* | 12/2007 | Ohishi | G06Q 10/06 700/113 |
| 2008/0001372 | A1* | 1/2008 | Hoffman | G06Q 10/087 280/35 |
| 2008/0091574 | A1* | 4/2008 | Hamaji | G06Q 10/087 705/28 |
| 2008/0183328 | A1* | 7/2008 | Danelski | G06Q 10/08 700/216 |
| 2008/0215179 | A1* | 9/2008 | Yair | G06Q 10/08 700/215 |
| 2009/0000912 | A1* | 1/2009 | Battles | B65G 1/1371 198/431 |
| 2009/0012836 | A1* | 1/2009 | Weissbach | G06Q 10/063 705/7.11 |
| 2009/0299521 | A1* | 12/2009 | Hansl | B65G 1/1373 700/215 |
| 2010/0033341 | A1* | 2/2010 | Ishida | G06Q 10/08 340/8.1 |
| 2010/0057542 | A1* | 3/2010 | Hironaka | G06Q 10/06 705/7.42 |
| 2010/0176964 | A1* | 7/2010 | Kobayashi | G06Q 10/08 340/8.1 |
| 2010/0316470 | A1* | 12/2010 | Lert | B65G 1/045 414/273 |
| 2011/0008137 | A1* | 1/2011 | Yamashita | B65G 1/0492 414/267 |
| 2011/0035247 | A1* | 2/2011 | Perry | G06Q 10/06 705/7.38 |
| 2011/0084162 | A1* | 4/2011 | Goossen | B64C 39/024 244/12.1 |
| 2011/0203231 | A1* | 8/2011 | Hortig | B65B 67/02 53/473 |
| 2011/0295413 | A1* | 12/2011 | Hara | G06Q 10/087 700/216 |
| 2011/0301994 | A1* | 12/2011 | Tieman | G06Q 10/06 705/7.15 |
| 2012/0029683 | A1* | 2/2012 | Keller | B25J 9/1687 700/214 |
| 2012/0029685 | A1* | 2/2012 | Keller | G06Q 10/087 700/216 |
| 2012/0109362 | A1* | 5/2012 | Goodman | B65G 47/918 700/213 |
| 2012/0291037 | A1* | 11/2012 | Venkataramanan | G06F 9/3012 718/103 |
| 2012/0330458 | A1* | 12/2012 | Weiss | B66F 9/063 700/216 |
| 2013/0096713 | A1* | 4/2013 | Takizawa | B65G 61/00 700/224 |
| 2013/0096735 | A1* | 4/2013 | Byford | G05D 1/0231 701/2 |
| 2013/0110280 | A1* | 5/2013 | Folk | B65G 1/137 700/215 |
| 2013/0110281 | A1* | 5/2013 | Jones | G06Q 10/08 700/228 |

(56) References Cited

U.S. PATENT DOCUMENTS

| | | | |
|---|---|---|---|
| 2013/0200916 A1* | 8/2013 | Panagas | G01R 1/0441 324/757.01 |
| 2013/0312371 A1* | 11/2013 | Ambrose | G06Q 10/087 53/473 |
| 2013/0317642 A1* | 11/2013 | Asaria | G06Q 50/28 700/216 |
| 2013/0338819 A1* | 12/2013 | Max | B65G 1/137 700/216 |
| 2014/0032034 A1* | 1/2014 | Raptopoulos | G08G 5/0069 701/25 |
| 2014/0032035 A1* | 1/2014 | Thomson | G05D 1/0274 701/25 |
| 2014/0052498 A1* | 2/2014 | Marshall | G06Q 30/0635 705/7.35 |
| 2014/0058556 A1* | 2/2014 | Kawano | G05D 1/0234 700/216 |
| 2014/0081445 A1* | 3/2014 | Villamar | G06Q 10/08 700/216 |
| 2014/0100999 A1* | 4/2014 | Mountz | G06Q 10/087 705/28 |
| 2014/0107833 A1* | 4/2014 | Segawa | G06Q 10/087 700/214 |
| 2014/0108028 A1* | 4/2014 | Braun | B65G 35/00 705/2 |
| 2014/0149244 A1* | 5/2014 | Abhyanker | G06Q 10/087 705/26.2 |
| 2014/0156553 A1* | 6/2014 | Leach | G06Q 10/08355 705/338 |
| 2014/0244026 A1* | 8/2014 | Neiser | B65G 1/1373 700/216 |
| 2014/0254896 A1* | 9/2014 | Zhou | B25J 9/0006 382/124 |
| 2014/0277854 A1* | 9/2014 | Jones | G05D 1/102 701/3 |
| 2014/0279294 A1* | 9/2014 | Field-Darragh | G06Q 10/087 705/28 |
| 2014/0350717 A1* | 11/2014 | Dagle | B65G 1/1373 700/216 |
| 2015/0025714 A1* | 1/2015 | Beer | G05B 19/4189 701/19 |
| 2015/0026436 A1* | 1/2015 | Achenbach | G06F 9/3836 712/214 |
| 2015/0032252 A1* | 1/2015 | Galluzzo | B25J 5/007 700/218 |
| 2015/0057793 A1* | 2/2015 | Kawano | G06Q 10/087 700/216 |
| 2015/0068875 A1* | 3/2015 | Berghorn | G06Q 10/08 198/890.1 |
| 2015/0073589 A1* | 3/2015 | Khodl | B25J 5/007 700/218 |
| 2015/0086304 A1* | 3/2015 | Hasman | G06Q 10/087 414/269 |
| 2015/0100461 A1* | 4/2015 | Baryakar et al. | G05D 1/0038 705/26.43 |
| 2015/0104286 A1* | 4/2015 | Hansl | B65G 1/1378 414/800 |
| 2015/0120514 A1* | 4/2015 | Deshpande | G06Q 10/08355 705/28 |
| 2015/0178671 A1* | 6/2015 | Jones | G06Q 10/087 705/28 |
| 2015/0269521 A1* | 9/2015 | Knapp | G06Q 10/08355 705/338 |
| 2015/0294260 A1* | 10/2015 | Napoli | G06Q 10/083 705/337 |
| 2015/0307278 A1* | 10/2015 | Wickham | G05B 15/02 700/216 |
| 2015/0332206 A1* | 11/2015 | Trew | G06Q 10/0836 705/330 |
| 2015/0370251 A1* | 12/2015 | Siegel | G05D 1/0027 701/2 |
| 2016/0027093 A1* | 1/2016 | Crebier | G07F 17/12 705/26.81 |
| 2016/0027095 A1* | 1/2016 | Boer | B65G 65/005 414/800 |
| 2016/0042314 A1* | 2/2016 | Mountz | G06Q 10/087 705/28 |
| 2016/0078523 A1* | 3/2016 | Lopez | G06Q 10/08 705/26.81 |
| 2016/0229634 A1* | 8/2016 | Yamashita | B65G 1/1378 |
| 2016/0260158 A1* | 9/2016 | High | E01H 5/12 |
| 2016/0355338 A1* | 12/2016 | Kazama | B65G 1/137 |
| 2017/0088355 A1* | 3/2017 | Khodl | B65G 1/1375 |

\* cited by examiner

| Order Number | Item Name | SKU | Pick Location | Cubby | Final Destination |
|---|---|---|---|---|---|
| 10001 | Phone | P1001 | A22 | 102 | Pack Area 1 |
| 10001 | Case | C2020 | A34 | 102 | Pack Area 1 |
| 10001 | Battery | B1010 | A45 | 102 | Pack Area 1 |
| 10002 | Shirt | 9912A | C19 | | Pack Area 2 |
| 10002 | Shoes | 9916S | C20 | | Pack Area 2 |
| 10003 | Blender | K22 | B02 | | Pack Area 1 |
| 10004 | Phone | P1002 | A23 | | Pack Area 3 |
| 10004 | Case | C2020 | A34 | | Pack Area 3 |

| Cubby | Attributes | Priority | Status |
|---|---|---|---|
| 102 | Medium | 1 | Available |
| 103 | Medium | 2 | Available |
| 104 | Small | 3 | Available |
| 105 | Large | 4 | Available |

FIG. 6

DYNAMIC CUBBY LOGIC

BACKGROUND

Distribution centers often include material handling systems comprised of various pieces of material handling equipment including a collection of one or more conveyors, carts, picking systems, put walls, and scanners, to move inventory items and/or assist employees in moving inventory items to fill customer orders. One piece of material handling equipment that is growing in use in distribution centers is the put wall. A put wall enables items to be consolidated into a common location, such as a cubby. By assigning all items for an order to the same cubby, the items may be grouped together for further processing, such as for packing into a single box for shipment.

In current distribution centers, orders are often received and grouped together in batches or waves. In current material handling systems, when a put wall is used to consolidate items for orders, a cubby of the put wall for each order of the batch or wave is assigned at a time prior to items for the order being picked, such as at the time the batch or wave is generated or released. Because each order is pre-assigned a cubby of the put wall, the number of orders in a batch or wave is constrained by the number of cubbies of the put wall in current material handling systems. Thus, current material handling systems employing put walls require additional physical infrastructure changes, such as the addition of put wall cubbies, to increase batch or wave size support capabilities. Additionally, because each order is pre-assigned a cubby of the put wall, cubbies are not reused within a batch or wave in current material handling systems. Thus, current material handling systems employing put walls can force employees working at the put wall to travel to less ergonomic or inefficient cubbies during the processing of a wave or batch.

SUMMARY

The systems, methods, devices, and non-transitory media of the various embodiments provide dynamic cubby logic that enables cubbies of a put wall to be assigned to orders as items for the orders are received at the put wall. In an embodiment, batches or waves of orders may be generated and released without cubbies of a put wall assigned to the orders. As the first item for an order is detected at the put wall a cubby from the available cubbies of the put wall may be selected for the order and all items of the order may be assigned the selected cubby. In an embodiment, the cubby may be selected from the available cubbies based at least in part on a priority among the cubbies of the put wall. In an embodiment, a next batch or wave of orders may be released without assigned cubbies of a put wall based at least in part on an estimated available cubby percentage of the put wall. In an embodiment, pick commands for a batch or wave may be sent without assigned cubbies of a put wall based at least in part on the size of the order and the available cubby percentage.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 6 is a data structure diagram illustrating potential elements of a cubby assignment table according to an embodiment.

DETAILED DESCRIPTION

Figure 1:
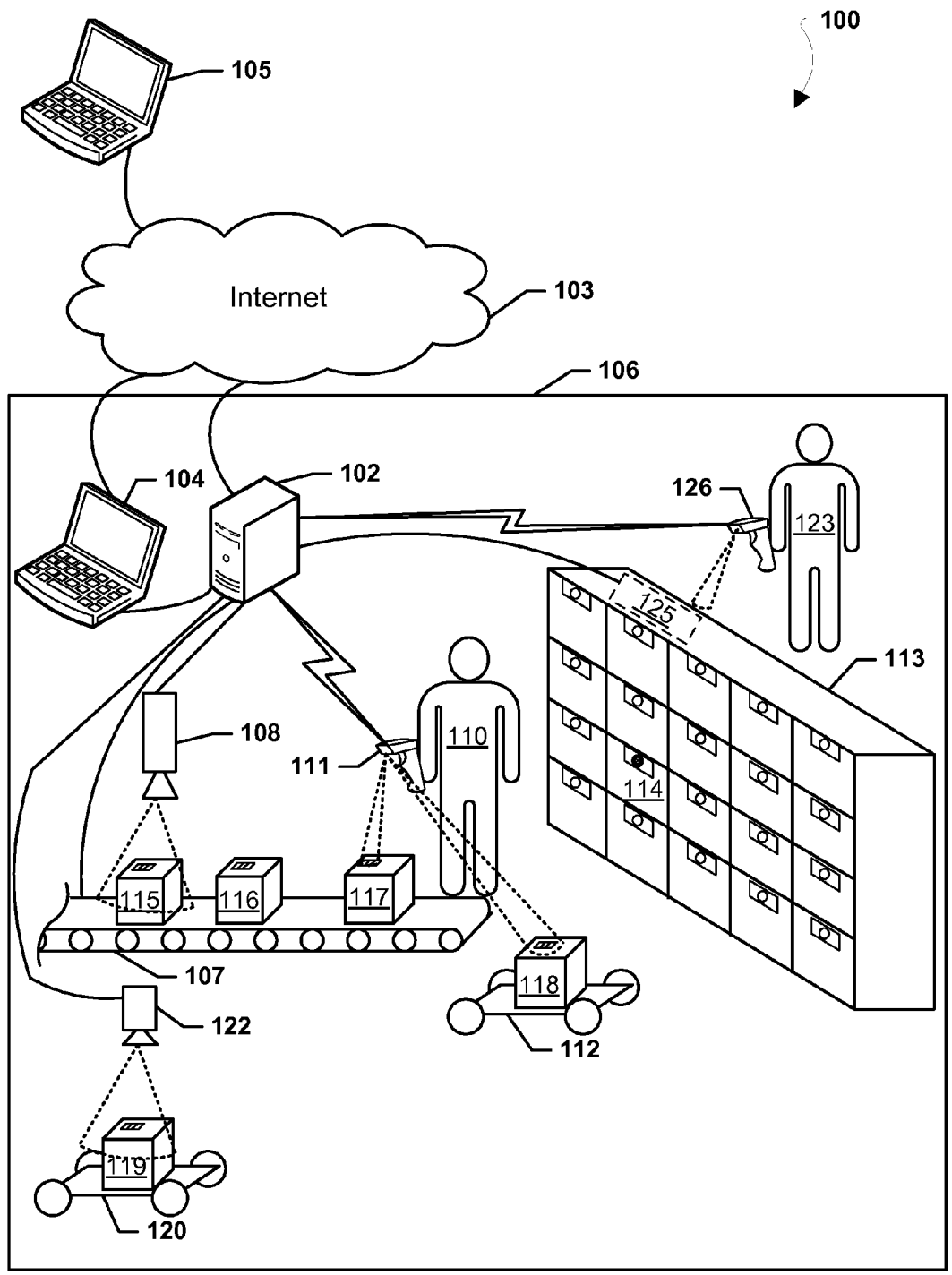
FIG. 1 is a system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" is used to refer to any one or all of desktop computers, personal data assistants (PDA's), laptop computers, tablet computers, smart books, palm-top computers, and similar electronic devices which include a programmable processor and memory and circuitry configured to provide the functionality described herein.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as laptop computer, thereby enabling it to function as a server (e.g., an enterprise e-mail server) only to the extent necessary to provide the functionality described herein.

As used herein, the term "put wall" is used to refer to a piece of material handling equipment that enables items of an order to be consolidated into a common location, such as a cubby, and indicates to an employee working at the put wall (i.e., a put wall employee) which cubby to place items into. Put walls applicable to the various embodiments may include any type of put wall, such as radio frequency (RF) directed put walls, light directed put walls, eye display directed put walls, voice directed put walls, combination of RF, light, eye display, and/or voice directed put walls, etc.

Put walls are discussed herein as being located within a distribution center. The discussions of distribution centers are provided merely as examples to better illustrate the aspects of the various embodiments and are not intended to limit the various embodiments in any way. Other facilities, such as warehouses, factories, etc., may be used with the various embodiments, and other facilities, such as warehouses, factories, etc., may be substituted in the various examples without departing from the spirit or scope of the invention.

The systems, methods, devices, and non-transitory media of the various embodiments provide dynamic cubby logic that enables cubbies of a put wall to be assigned to orders as items for the orders are received at the put wall. In an embodiment, batches or waves of orders may be generated and released without cubbies of a put wall assigned to the orders. As a first item for an order is detected at the put wall, a cubby from the available cubbies of the put wall may be selected for the order and all items of the order may be assigned the selected cubby. In this manner, the cubbies in the put wall may be assigned dynamically as orders being to arrive in the vicinity of the put wall.

As used herein, the term "vicinity of the put wall" refers to an area associated with the put wall and outside of the cubbies of the put wall itself. As an example, an item on a conveyor moving from a divert point toward a put wall may be considered to be in the vicinity of a put wall. As another example, an item in a cart being wheeled to a put wall may be considered to be in the vicinity of a put wall. As a further example, an item being handled by a piece of material handling equipment such that the only delivery point possible from the item's current point in the distribution center is to a put wall employee working at the put wall may be considered to be in the vicinity of the put wall. As an additional example, an item picked up and/or scanned by a put wall employee working at the put wall may be considered to be in the vicinity of the put wall.

In an embodiment, cubbies may be reused as cubbies become available for consolidation of further orders. In an embodiment, when all items for an order are indicated as present (or consolidated) at the assigned cubby, the cubby may be shifted from unavailable to available. For example, an indication for the cubby may be shifted from unavailable to available in a cubby assignment table when all items for an order are consolidated at the assigned cubby. In this manner, the cubby may be made available for use by other orders, such as other orders of the current batch and/or orders of a pending batch, and the cubby may be constantly reused as it becomes available. This may enable the number of orders in batches or waves to not be resource constrained by the number of cubbies in a put wall. For example, each wave or batch of orders may include more orders than are present in the put wall because early arriving orders may be cleared freeing the cubby for reuse by later arriving orders.

In an embodiment, the cubby may be selected from the available cubbies based at least in part on a priority among the cubbies of the put wall. Cubbies of a put wall may be assigned priority attributes and the priority attributes may enable prioritization of one cubby over another cubby. In an embodiment, priority attributes may be based at least in part on a put wall employee efficiency metric. Put wall employee efficiency metrics may be measurements related to how an employee may interact with the put wall. As an example, an employee efficiency metric may be a travel distance from an item delivery point, such as an end of a conveyor delivery items, to each cubby of a put wall. The cubbies with shorter distances may be prioritized over cubbies with longer distances. Additionally, employee efficiency metrics may be based on a height of the employee, or an average employee height, such that cubbies at a preferred zone in relation to the employee's height (e.g., between "knee to neck" sometimes referred to as being in the "golden zone") may be prioritized over cubbies that are outside of the preferred zone. These cubbies may be more ergonomic cubbies (e.g., easier for the employee to reach) than cubbies outside the preferred zone (i.e., less ergonomic cubbies). In addition, priority attributes may be based on other factors in addition to or in place of efficiency metrics, such as the relationship between a cubby and another employee tasked with pulling items from the cubby, the relationship between a cubby and other pieces of material handling equipment, the usage rate of the cubby, the reliability or failure rate of the cubby, etc. By continually checking for available cubbies and assigning orders to the highest priority cubbies that are available as the orders arrive at the put wall, orders may be repeatedly assigned to the highest priority cubbies as those cubbies are cleared (i.e., made available again). This may enable the travel distance for a put wall employee to be reduced when for a batch (when compared with the same batch being assigned to cubbies when the batch is generated) because the cubbies with the shortest travel distance (i.e., the high priority cubbies) may be used repeatedly during the batch rather than only once per batch.

In an embodiment, a next batch or wave of orders may be released without assigned cubbies of a put wall based at least in part on a determined current available cubby percentage. When a wave or batch of orders is generated by grouping a threshold number of orders together (e.g., any number of orders, such as 1 order, 2 orders, 10 orders, 100 orders, more than 100 orders, etc.), a determination of the current available cubby percentage may be made. In an embodiment, the current available cubby percentage may be determined by dividing the number of available cubbies for a put wall by the total number of cubbies for the put wall. In response to the available cubby percentage being at or above a minimum percentage value (i.e., a percentage of available cubbies supporting release of the pending batch of orders), the pending or next batch or wave of orders may be released and pick commands sent for the items of the batch or wave without assigning cubbies. The minimum percentage value need not be a 100% or even a number of cubbies equal to the number of orders in the pending batch. Rather, the minimum percentage value may be a percentage of available cubbies equivalent to less than the number of orders in the pending batch because current unavailable cubbies may become available while the items for the orders of the pending batch are in transit from their respective picking locations to the pick wall. In this manner, by dynamically assigning cubbies, a next or pending batch or wave may be released prior to the completion of a current batch or wave and batches or waves of orders may overlap.

In an embodiment, a next batch or wave of orders may be released without assigned cubbies of a put wall based at least in part on an estimated available cubby percentage. An estimated available cubby percentage may be based on the items in transit for the batch or wave being currently processed and the transit time for those items to reach their assigned cubbies of the put wall as well as the transit time for items in the pending batch or wave to move from their pick locations to the put wall. For example, based on the speed of pieces of material handling equipment in the distribution center (such as conveyor speeds) and the route to the put wall, the time needed for each remaining item of a current batch or wave that have not reached the put wall yet may be calculated. The time needed for each item of the pending batch or wave to reach the put wall from their inventory locations may also be calculated based on the speed of pieces of material handling equipment in the distribution center (such as conveyor speeds) and the route to the put wall. Based on the transit time for the items of the current batch or wave the number of cubbies that become available before the first item of the pending batch would reach the vicinity of the put wall may be determined. This estimated number of available cubbies when the first item of the pending batch would reach the vicinity of the put wall may be used to determine the estimated available cubby percentage by dividing the number by the total number of cubbies. In response to the estimated available cubby percentage being at or above a minimum percentage value (i.e., a percentage of estimated available cubbies supporting release of the pending batch of orders), the pending or next batch or wave of orders may be released and pick commands sent for the items of the batch or wave without assigning cubbies. The minimum percentage value need not be a 100% or even a number of cubbies equal to the number of orders in the pending batch. Rather, the minimum percentage value may be a percentage of estimated available cubbies equivalent to less than the number of orders in the pending batch because current unavailable cubbies may become available while the items for the orders of the pending batch are in transit from their respective picking locations to the pick wall. In this manner, by dynamically assigning cubbies, a next or pending batch or wave may be released prior to the completion of a current batch or wave and batches or waves of orders may overlap.

In an embodiment, pick commands for a batch or wave may be sent without assigned cubbies of a put wall based at least in part on the size of the order and the available cubby percentage. In an embodiment, when a batch or wave is released the orders of the batch or wave may be sorted based on the number of items per order. In this manner, the orders of the batch or wave may be organized from the smallest orders to the largest orders or vice versa. A determination of the current available cubby percentage may be made, for example by dividing the number of available cubbies for a put wall by the total number of cubbies for the put wall. The current available cubby percentage may be compared to an order size switchover threshold, which may be a predetermined percentage selected to control which types of orders are picked first (e.g., large orders or small orders). When the current available cubby percentage is below the order size switchover threshold, pick commands for the items of the smallest number of items order may be sent without assigning a cubby to the order. In this manner, smaller orders (i.e., those with fewer items per order) which should clear through a cubby of the put wall quicker than larger orders (because there are fewer items to consolidate) may be selected to pick because the current available cubby percentage is below the order size switchover threshold. When the current available cubby percentage is at or above the order size switchover threshold, pick commands for the items of the largest number of items order may be sent without assigning a cubby to the order. In this manner, large orders (i.e., those with more items per order) which may take longer to clear through a cubby of the put wall quicker than smaller orders (because there are more items to consolidate) may be selected to pick because the current available cubby percentage is at or above the order size switchover threshold.

FIG. 1 is a system block diagram of a network 100 suitable for use with the various embodiments. The network 100 may include one or more ordering computing device 105, one or more distribution center user computing device 104, one or more distribution center server 102, and various pieces of material handling equipment including one or more conveyor 107, carts 112 and 120, one or more put wall 113, and/or scanners 108, 111, 122, and 126. The ordering computing device 105, the distribution center server 102, and the distribution center user computing device 104, may each be connected to the Internet 103. The ordering computing device 105 may be a computing device used by a customer, such as a customer ordering via a website, and/or another entity, such as a retail outlet, to generate orders for items stocked in the distribution center 106. The distribution center user computing device 104 may be connected, via the Internet 103 or directly, to the distribution center server 102, and may be a computing device used by an employee in the distribution center 106 to input information, such as user selectable thresholds, settings, or other values, into the distribution center server 102. The distribution center server 102 may be connected, via wired or wireless connections, to the pieces of material handling equipment within the distribution center 106 such as the conveyor 107, carts 112 and 120, put wall 113, and scanners 108, 111, 122, and 126 and the distribution center server 102, conveyor 107, carts 112 and 120, put wall 113, and/or scanners 108, 111, 122, and 126 may exchange data with one another via their respective connections. In various embodiments, the distribution center server 102 may control the operation of the pieces of material handling equipment within the distribution center 106, such as the conveyor 107, carts 112 and 120, put wall 113, and scanners 108, 111, 122, and 126 to move items within the distribution center 106 to fill orders.

In operation, the ordering computing device 105 may send orders to the distribution center server 102 via the Internet 103. The distribution center server 102 may receive the orders and generate batches or orders to be filed by inventory in the distribution center 106. The distribution center server 102 may release the batched orders and generate pick commands for the items of the orders and control material handling equipment within the distribution center 106, including conveyor 107 and/or carts 112 and 120, to move the picked items toward the pick wall. In an embodiment, batches may be generated and released and the pick commands sent without cubbies of the put wall 113 being assigned for orders. As items, such as items 115, 116, 117, 118, and 119 enter the vicinity of the put wall 113, the items may be scanned by scanners 108 and/or 122. For example, the scanners 108 and 122 may image and read barcodes of labels affixed to the items. In an embodiment, when a first item of an order is determined to be within the vicinity of the put wall 113 the distribution center server 102 may assign a cubby of the put wall 113, to the order of the first item. When the employee 110 working at the put wall scans the item 117 at the end of the conveyor 107 (or the next item 118 in the next cart 112) with his or her scanner 111, the distribution center server 102 may recognize the item 117 (or 118) is ready to be put in its respective assigned cubby 114. The distribution center server 102 may send an indication to the controller 125 of the put wall 113 that cubby 114 is the assigned cubby for the item 117 (or 118), and the controller 125 may control the lights of the put wall 113 to illuminate an indication of cubby 114. Illumination of a light or display is only one manner of operation for a put wall 113, other examples include radio frequency directed put walls, an eye display directed put wall (e.g., a goggle worn by the employee 110 indicates the assigned cubby 114 visually), or a voice directed put wall (e.g., a headset worn by the employee 110 generates an audible indication of the assigned cubby 114). The employee 110 may place the item 117 (or 118) in the assigned cubby 114, and may indicate the item as placed in the cubby (e.g., via a voice confirmation). When all items for an order are consolidated in their assigned cubby, another employee 123 (for example an employee on the other side of a pass through type put wall) may pull the consolidated items from their assigned cubby and transport the consolidated order to its next destination, such as a packing station for eventual shipment out of the distribution center 106. The other employee 123 may scan the items for the order and/or the assigned cubby with the scanner 126 when pulling the items to indicate to the distribution center server 102 the items are pulled.

Figure 2:
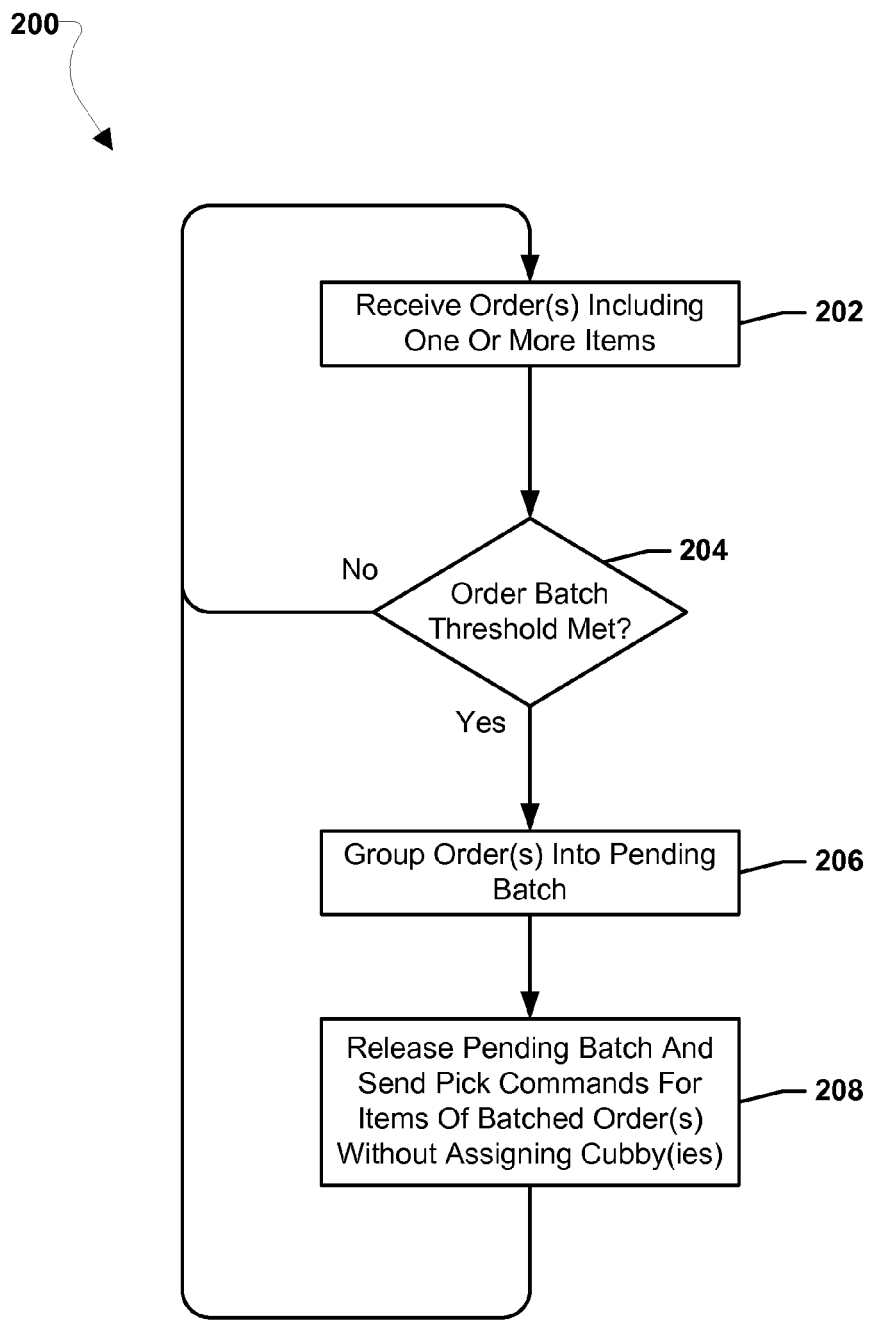
FIG. 2 is a process flow diagram illustrating an embodiment method for generating a batch of one or more orders each having one or more items without assigning any cubbies of a put wall for the orders.

FIG. 2 illustrates an embodiment method 200 for generating a batch of one or more orders each having one or more items without assigning any cubbies of a put wall for the orders. In an embodiment, the operations of method 200 may be performed by a processor of a computing device, such as a processor of a distribution center server. In an embodiment, the operations of method 200 may be performed in conjunction with the operations of methods 400, 700, 900, and/or 1100 described below. In block 202 the processor may receive one or more orders each including one or more items. The orders may be any type of orders, including direct to customer shipments (e.g., e-commerce orders), inventory replenishment orders from retail locations (e.g., a restocking order), etc. The orders may be received individually or in groups from one or more various sources, including sources external to the distribution center, such as a central order processing system, directly from an e-commerce server, directly from a customer or retailer computing device, etc. and/or sources internal to the distribution center, such as an order processing module of the distribution center server, an order entry terminal, etc.

In determination block 204 the processor may determine whether an order batch threshold is met. In an embodiment, an order batch threshold may be a set value reflecting a minimum number of orders and/or number of items needed before releasing an order. The minimum number of orders and/or items may be selected to reflect a level of work that justifies efforts in processing orders. In this manner, costs and time associated with operating material handling equipment and processing orders may not be expended until a minimum number of orders and/or items are collected. In response to determining the batch threshold is not met (i.e., determination block 204="No"), the processor may continue to receive orders in block 202 and check the number of received orders and/or items against the batch threshold in determination block 204.

In response to determining the batch threshold is met (i.e., determination block 204="Yes"), in block 206 the processor may group the orders into a pending batch. In an embodiment, the processor may group the orders into a batch by creating a data structure including data for all the orders, such as batch table described below. Other examples for grouping orders may include assigning a batch number to orders in a database table, or otherwise relating the orders in a database. In block 208 the processor may release the pending batch and generate pick commands for the items of batched orders without assigning cubbies to the items. Releasing a pending batch may include sending one or more indications of orders within the batch, such as a data structure including the information for the orders, to a picking module which may control material handling equipment to enable items for orders to be picked. The picking module may receive the released batch and generate pick commands to enable the items for the orders within the batch to be picked from their current inventory locations. For example, a generated pick command may be an indication sent to a voice picking system to output a voice indication directing a picking employee to pick an item and quantity for the item needed to fill an order of the batch. Pick commands may be generated and sent in any order for the batch, sequentially and/or simultaneously, and may be sent to one or more pieces of material handling equipment or other systems enabling items to be picked to fill orders. In an embodiment, cubbies in the put wall may not be assigned at the time the pending batch is released or when pick commands are generated or sent. In this manner, items may be picked and moved from their inventory locations toward the put wall without the cubby for the order being assigned. For example, a cubby field in a batch table may be blank because the cubbies for the orders may not be assigned when the pending batch is released and pick commands are generated and sent.

Figure 3:
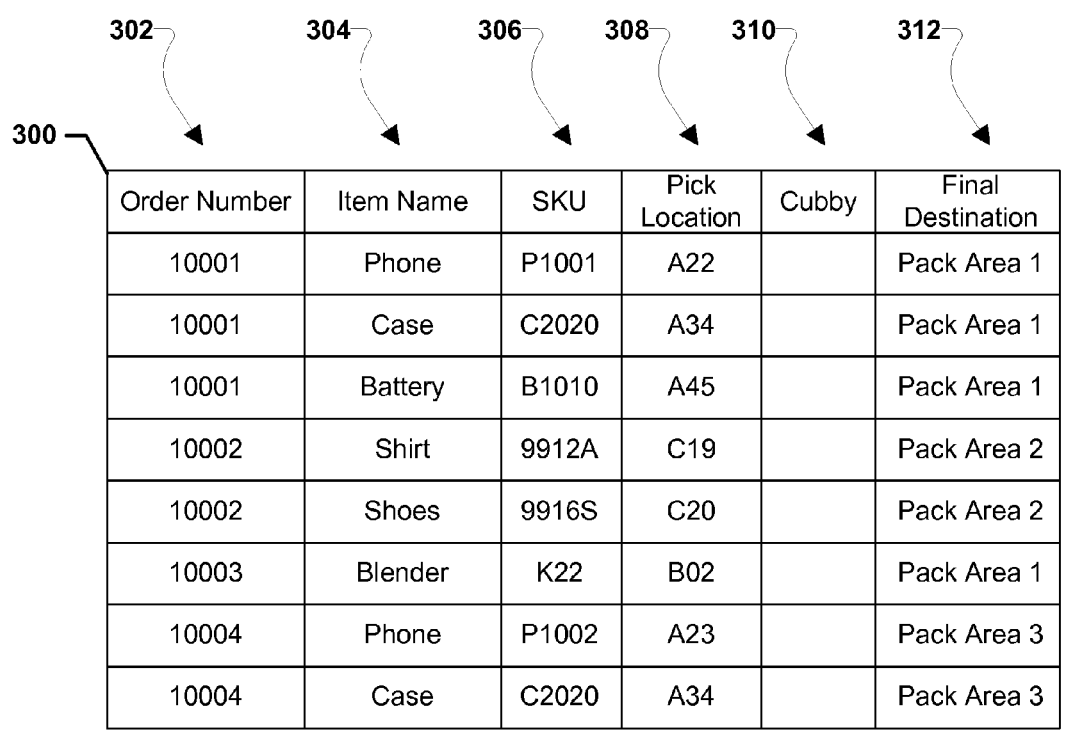
FIG. 3 is a data structure diagram illustrating potential elements of a batch table according to an embodiment.

FIG. 3 is a data structure diagram illustrating potential elements of a batch table 300 according to an embodiment. The batch table 300 may include various data fields, including an order number 302, item name 304, stock keeping unit ("SKU") 306, pick location 308, cubby 310, and final destination 312. The batch table 300 may be stored in a memory available to a processor of a distribution center server. Order number 302, item name 304, stock keeping unit ("SKU") 306, pick location 308, cubby 310, and final destination 312 are merely examples of data fields that may be included in the batch table 300, and more or less data fields may be included in batch table 300. As an example, the order number 302 may be an indication of the unique order number assigned to an order to be filled in a distribution center. One or more items may be associated with each order number 302 in the batch table 300. As an example, an item name 304 may be the name of an item stocked in the distribution center. As an example, a stock keeping unit ("SKU") 306 may be the unique identifying number assigned to each item stocked in the distribution center enabling items to be distinguished from one another. As an example, a pick location 308 may be the inventory location from which the item is to be drawn or picked to fill the order. As an example, the cubby 310 may be the assigned cubby of the put wall the items of the order are to be consolidated into. In an embodiment, when generated and when released the batch table 300 may not list any cubbies for orders as the cubbies may not be assigned for an order until a first item of the order of the batch is detected in a vicinity of the put wall. As an example, the final destination 312 may be the area the order may be destined for some time after being consolidated, such as a packing area prior to shipment from the distribution center.

FIG. 3 illustrates the batch table 300 at a time before any items for the batch may have been determined to be in the vicinity of the put wall. Thus the cubby data field 310 for each order may be blank. Without the cubby 310 listed for the orders, the batch table 300 may enable items to be picked and placed onto conveyors or into carts to start moving toward the put wall, for example because the final destination 312 may be indicated. In this manner, items to fill orders for the batch may start moving through the distribution center without cubbies being assigned.

Figure 4:
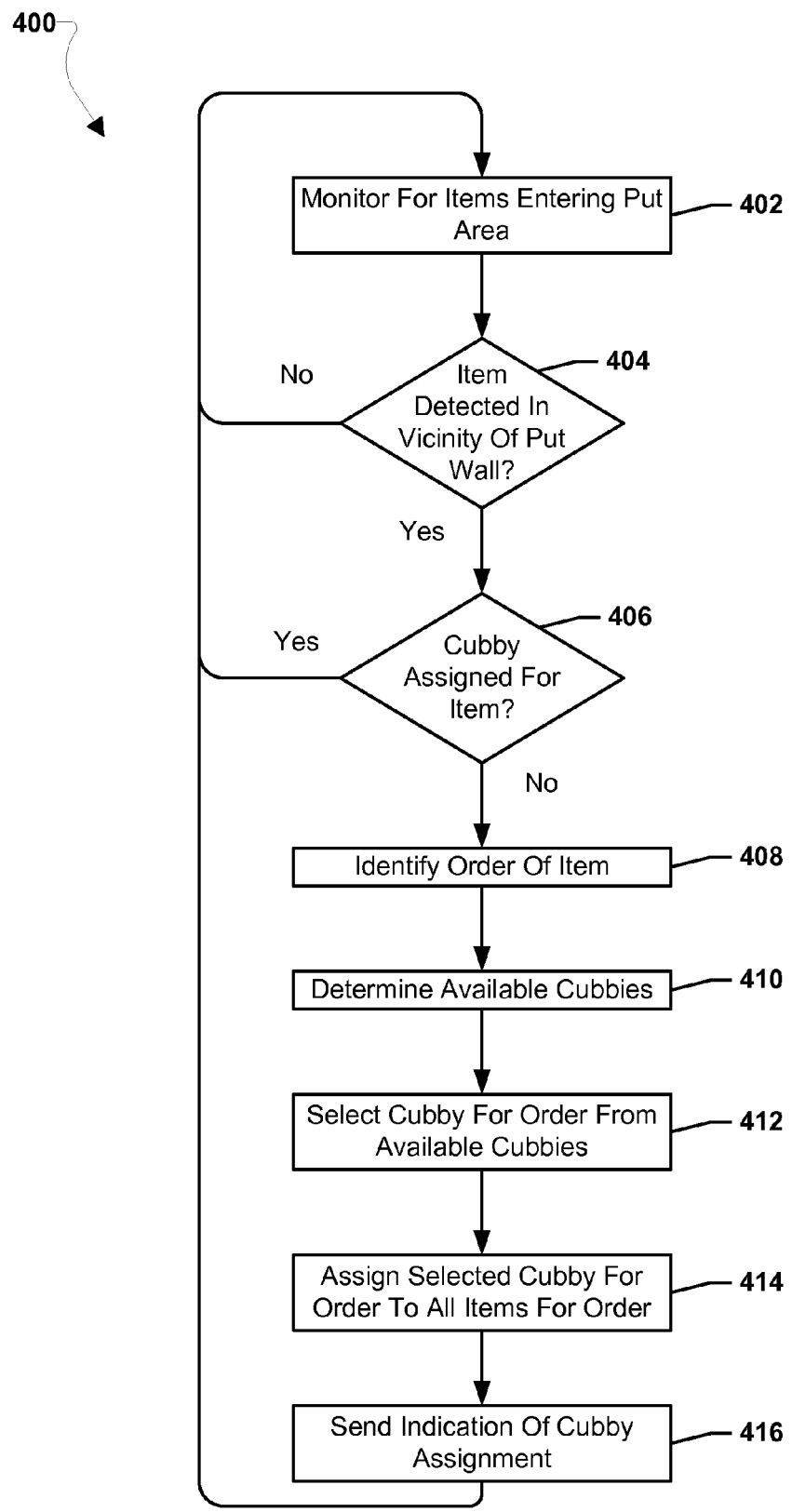
FIG. 4 is a process flow diagram illustrating an embodiment method for assigning cubbies to orders as items are detected in the vicinity of a put wall.

FIG. 4 illustrates an embodiment method 400 for assigning cubbies to orders as items are detected in the vicinity of a put wall. In an embodiment, the operations of method 400 may be performed by a processor of a computing device, such as a processor of a distribution center server. In an embodiment, the operations of method 400 may be performed in conjunction with the operations of method 200 described above and/or the operations of methods 700, 1000, and/or 1100 described below.

In block 402 the processor may monitor for items entering the put area. The put area may be the vicinity of the put wall, such as an area associated with the put wall and outside of the cubbies of the put wall itself. As an example, an item on a conveyor moving from a divert point toward a put wall may be considered to be in the vicinity of a put wall. As another example, an item in a cart being wheeled to a put wall may be considered to be in the vicinity of a put wall. As a further example, an item being handled by a piece of material handling equipment such that the only delivery point possible from the item's current point in the distribution center is to a put wall employee working at the put wall may be considered to be in the vicinity of the put wall. As an additional example, an item picked up and/or scanned by a put wall employee working at the put wall may be considered to be in the vicinity of the put wall. In an embodiment, a scanner, camera, and/or other imaging device may scan the items as the items enter the vicinity of the put wall and may send an indication of any detected item (e.g., its SKU, order number, item name, and/or any other information detected on a barcode label affixed to the item) to the processor enabling the processor to monitor items entering the put area.

In determination block 404 the processor may determine whether an item is detected in the vicinity of the put wall. In an embodiment, the processor may determine whether a valid indication of an item is received from the scanner, camera, and/or other imaging device scanning the items as the items enter the vicinity of the put wall. In response to determining an item is not detected in the vicinity of the put wall (i.e., determination block 404="No"), in block 402 the processor may continue to monitor for items entering the put area.

In response to determining an item is detected in the vicinity of the put wall (i.e., determination block 404="Yes"), in determination block 406 the processor may determine whether a cubby is assigned for the item. In an embodiment, orders and the items of the orders may not initially be assigned cubbies when a batch is released and/or when items are picked. The processor may compare the information for the item to a batch table to determine whether the item is assigned a cubby or not. In response to determining the item is assigned a cubby (i.e., determination block 406="Yes"), in block 402 the processor may continue to monitor for items entering the put area.

In response to determining the item is not assigned a cubby (i.e., determination block 406="No"), in block 408 the processor may identify the order of the item. As an example, the processor may reference a batch table to identify the order associated with the item. In block 410 the processor may determine the available cubbies in the put wall. In an embodiment, available cubbies in the put wall may be cubbies that are not currently assigned to an order. As an example, the processor may reference a cubby assignment table to determine the status of the cubbies of the put wall and may determine the available cubbies as those cubbies with a status indicating they are available.

In block 412 the processor may select a cubby for the order from the available cubbies. In the various embodiments, cubbies may be selected in various manners, including in order, randomly, based on a priority among cubbies, based on attributes of the items of the orders, etc. In block 414 the processor may assign the selected cubby for the order to all items for the order. As an example, the processor may indicate the selected cubby by populating an indication of the selected cubby in a cubby field of a batch table for all items of the order. In this manner, all items for the order may be assigned a cubby when or after the first item is determined to be in the vicinity of the put wall, whether or not additional items of the order have arrived at the vicinity of the put wall. In block 416 the processor may send an indication of the cubby assignment. In an embodiment, indications of the cubby assignment may be sent to a controller of the put wall and/or to a put wall control module to enable the status of the selected cubby to be changed from available to unavailable.

Figure 5:
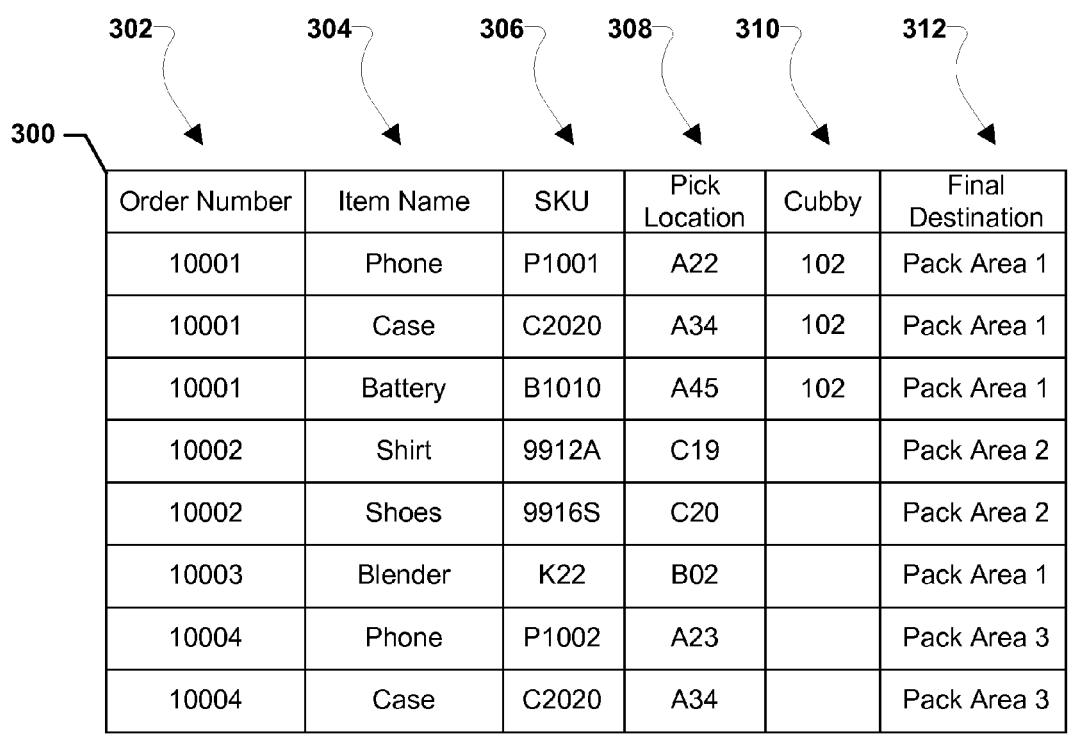
FIG. 5 is a data structure diagram illustrating potential elements of the batch table illustrated in FIG. 3 after assigning a selected cubby to all items of a first order.

FIG. 5 is a data structure diagram illustrating potential elements of the batch table 300 illustrated in FIG. 3 after assigning a selected cubby to all items of a first order. For example, the first item of order "10001" to arrive in the vicinity of the put wall may be determined to be the "Battery" with SKU "B1010" picked from location "A45" and destined for "Pack Area 1". As described above, cubby "102" may be selected for consolidating the order "10001" and the cubby "102" may be assigned to the order by indicating the cubby "102" in the cubby field 310 for the "Battery" and the other items of order "10001" regardless of whether the "Phone" SKU "P1001" or "Case" SKU "C2020" have arrived in the vicinity of the put wall.

FIG. 6 is a data structure diagram illustrating potential elements of a cubby assignment table 600 according to an embodiment. The cubby assignment table 600 may include various data fields, including a cubby field 602, attribute field 604, priority field 606, and status field 608. The cubby assignment table 600 may be stored in a memory available to a processor of a distribution center server, such as a memory of a put wall. The cubby field 602 may be an indication of the cubbies of a put wall. The attributes field 604 may be an indication of the attributes of the cubby, for example the size of the cubby "medium", "small", "large", etc. The priority field 606 may be the assigned priority of one cubby over another cubby. The priority field 606 may indicate the cubbies assigned priority attribute. In this manner, the cubbies with higher priority, such as those cubbies in the golden zone, may be separated from those cubbies with lower priority, such as those cubbies that are less ergonomic (e.g., outside the golden zone). The status field 608 may indicate the availability or unavailability of the cubbies.

Figure 7:
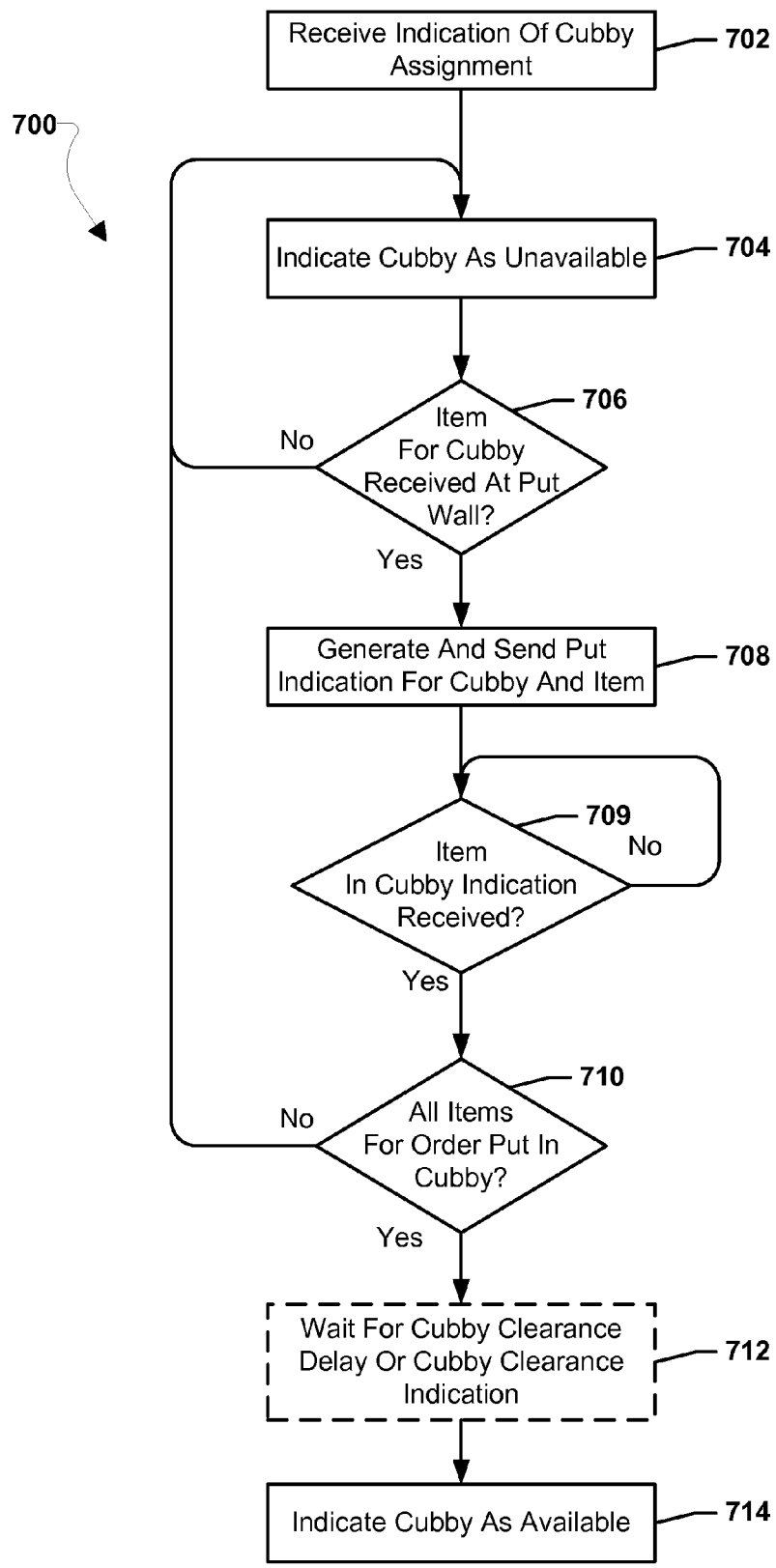
FIG. 7 is a process flow diagram illustrating an embodiment method for indicating a cubby is available or unavailable.

FIG. 7 illustrates an embodiment method 700 for indicating a cubby is available or unavailable. In an embodiment, the operations of method 700 may be performed by a processor of a computing device, such as a processor of a distribution center server or a processor of a put wall controller. In an embodiment, the operations of method 700 may be performed in conjunction with the operations of methods 200 and/or 400 described above and/or methods 900, 1000, and/or 1100 described below.

In block 702 the processor may receive an indication of a cubby assignment. As described above, an indication of a cubby assignment may be generated upon determining a first item of an order is in the vicinity of the put wall, and may, for example, be received at a put wall control module or put wall controller. The indication of the cubby assignment may indicate identify the cubby that was selected for an order. In block 704 the processor may indicate the cubby as unavailable. In determination block 706 the processor may determine whether an item for the cubby was received at the put wall. As an example, the processor may determine whether an item was received at the put wall based on the item being scanned or otherwise identified by an employee working at the put wall. In response to determining an item for the cubby was not received (i.e., determination block 706="No"), in block 704 the processor may continue to indicate the cubby as unavailable.

In response to determining an item for the cubby was received at the put wall (i.e., determination block 706="Yes"), in block 708 the processor may generate and send a put indication for the cubby and item. As an example, the distribution center server processor may generate and send a command/indication to the put wall controller indicating a light to illuminate, a sound (e.g., voice command) to generate, and/or some other output to generate to indicate the item is to be placed in the cubby for that order and the put wall controller may illuminate the light, generate the sound, and/or generate the other output as the put indication for the item. As another example, the put wall controller may generate and send the put indication independent of the distribution center server by illuminating a light, generating a sound (e.g., voice command), and/or generating some other output to indicate the item is to be placed in the cubby it is assigned. In determination block 709 the processor may determine whether the item in cubby indication is received. As an example, the distribution center server processor and/or put wall controller processor may determine whether a voice confirmation from the put wall employee is received indicating the item was stowed in the correct cubby. Other item in cubby indications may include RFID indications, button press events, etc. In response to determining the item in cubby indication is not received (i.e., determination block 709="No"), the processor may continue to determine whether the item in cubby indication is received in determination block 709.

In response to determining the item in cubby indication is received (i.e., determination block 709="Yes"), in determination block 710 the processor may determine whether all items for the order are put in the cubby. As an example, the processor may compare the indications of items placed in the cubby to the items associated with the order, such as in a batch order table, to determine whether any items remain to be consolidated in the cubby. In response to determining all items for the order are not in the cubby (i.e., determination block 710="No"), in block 704 the processor may continue to indicate the cubby as unavailable.

In response to determining all items for the order are in the cubby (i.e., determination block 710="Yes"), in optional block 712 the processor may wait for a cubby clearance delay or cubby clearance indication. In this optional embodiment, the delay or indication of cubby clearance may enable the items within the cubby to be physically removed prior to changing the status of the cubby. The delay or indication of clearance may be optional because the time to clear the cubbies may be low enough compared to the time to receive another item in the cubby when reused that items for two different orders may not be at risk of overlapping. In block 714 the processor may indicate the cubby as available. In this manner, once the items for the current order have been consolidated in the cubby the cubby may be made available for use by a follow on order enabling cubbies to be reused for multiple orders of a batch and/or additional batches to be released prior to the completion of a current batch.

Figure 8:
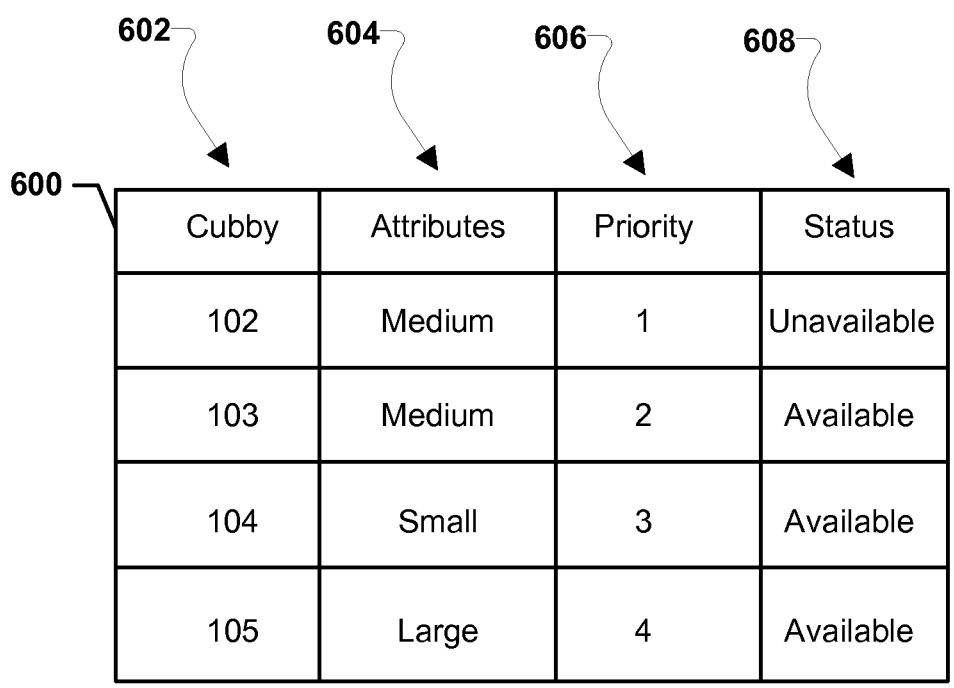
FIG. 8 is a data structure diagram illustrating potential elements of the cubby assignment table illustrated in FIG. 6 after indicating a selected cubby is unavailable in response to assigning the selected cubby to all items of a first order.

FIG. 8 is a data structure diagram illustrating potential elements of the cubby assignment table 600 illustrated in FIG. 6 after indicating a selected cubby is unavailable in response to assigning the selected cubby to all items of a first order. For example, the cubby "102" may be assigned to consolidate the items for an order, such as order "10001" described above and the status of cubby "102" may be indicated as "Unavailable" in the status field 608. Thus, the cubby assignment table 600 may indicate that only cubbies "103", "104", and "105" are currently available for selection to consolidate orders. The cubby "102" may have been selected because it had the highest relative priority "1" when all cubbies were available. While illustrated as "1" being the highest priority, other ranking systems may be used, for example with the highest value priority in the priority field 606 indicating the highest priority cubby.

Figure 9:
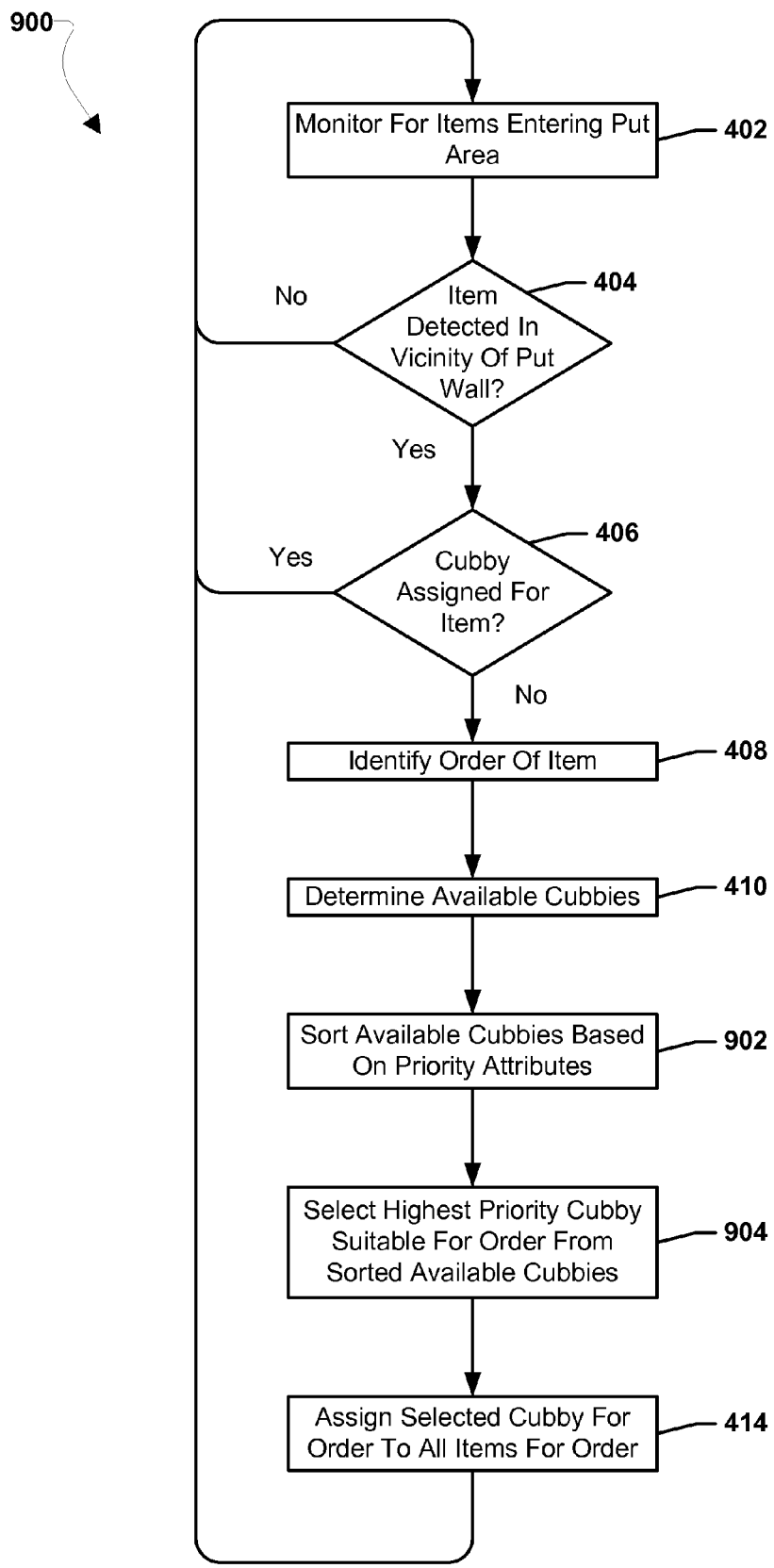
FIG. 9 is a process flow diagram illustrating another embodiment method for assigning cubbies to orders as items are detected in the vicinity of a put wall.

FIG. 9 illustrates another embodiment method 900 for assigning cubbies to orders as items are detected in the vicinity of a put wall. In an embodiment, the operations of method 900 may be performed by a processor of a computing device, such as a processor of a distribution center server. In an embodiment, the operations of method 900 may be performed in conjunction with the operations of methods 200 and/or 700 described above and/or methods 1000 and/or 1100 described below.

In blocks 402, 404, 406, 408, and 410 the processor may perform operations of like numbered blocks of method 400 described above with reference to FIG. 4. In block 902 the processor may sort the available cubbies based on priority attributes of the available cubbies. In the various embodiments, priority attributes may be priorities among the cubbies assigned to each cubby enabling cubbies to be compared to one another. Priority attributes may be based at least in part on a put wall employee efficiency metrics, such as a travel distance from an item delivery point (e.g., the end of a conveyor) to each cubby. For example, cubbies farther from the end of the conveyor may be given a lower priority than cubbies closer to the end of the conveyor. The priority attribute may be a number ranking, letter value, or some other indication of the relative priority of the cubbies. The processor may use the priority attributes to sort the available cubbies such that the available cubbies are ranked in order from highest priority available cubby to lowest priority available cubby. In block 904 the processor may select the highest priority cubby suitable for the order from the sorted available cubbies. In this manner, the highest priority cubby available may be used to consolidate the order. As described above, in block 414 the processor may assign the selected cubby for the order to all items for the order.

Figure 10:
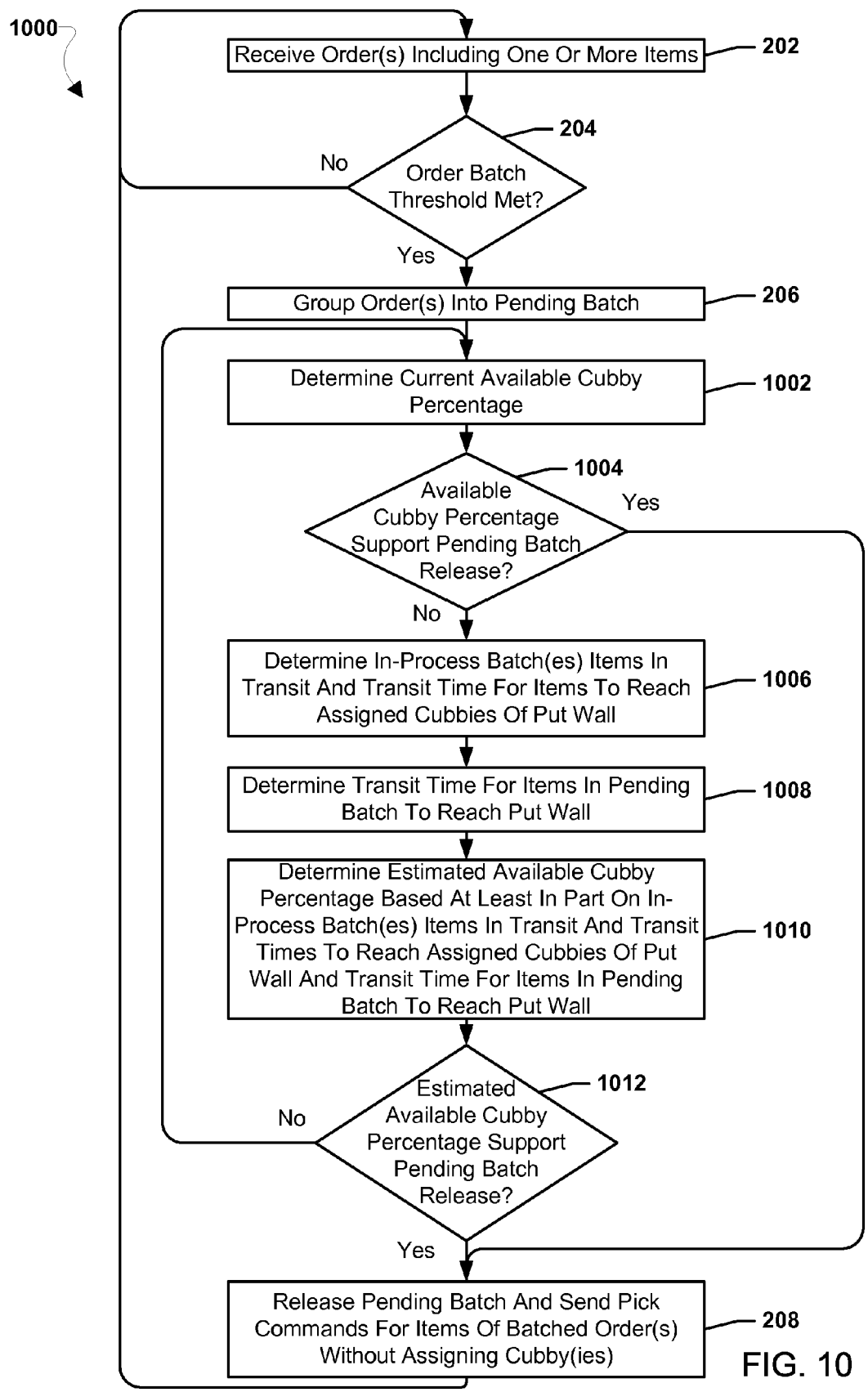
FIG. 10 is a process flow diagram illustrating another embodiment method for generating a batch of one or more orders each having one or more items without assigning any cubbies of a put wall for the orders.

FIG. 10 illustrates another embodiment method 1000 for generating a batch of one or more orders each having one or more items without assigning any cubbies of a put wall for the orders. In an embodiment, the operations of method 1000 may be performed by a processor of a computing device, such as a processor of a distribution center server. In an embodiment, the operations of method 1000 may be performed in conjunction with the operations of methods 400, 700, and/or 900 described above and/or method 1100 described below.

As described above, in block 202 the processor may receive one or more orders including one or more items, in determination block 204 the processor may determine whether the order batch threshold is met, and in block 206 the processor may group one or more orders into pending batches. In block 1002 the processor may determine the current available cubby percentage. In an embodiment, the current available cubby percentage may be determined as the number of available cubbies over the number of total cubbies in the put wall. As an example, the available cubbies may be identified based on a cubby assignment table as described above. In determination block 1004 the processor may determine whether the available cubby percentage supports pending batch release. As an example, the processor may compare the current available cubby percentage to a batch release threshold to determine whether the batch release threshold is met or exceeded indicating the current available cubby percentage supports release of the batch. For example, the batch release threshold may be a percentage value selected based on the speed of the conveyors in the distribution center, size of batches, etc. The batch release threshold may be user selectable and may be adjustable, for example based on current operating conditions in the distribution center. In response to determining the available cubby percentage supports release of the batch (i.e., determination block 1004="Yes"), as described above in block 208 the processor may release the pending batch and send pick commands for items of the batched orders without assigning cubbies.

In response to determining the available cubby percentage does not support release of the batch (i.e., determination block 1004="No"), in block 1006 the processor may determine in-process batch or batches items in transit and transit time for items to reach assigned cubbies of the put wall. For example, based on the speed of pieces of material handling equipment in the distribution center (such as conveyor speeds) and the route to the put wall, the time needed for each remaining item of a current batch or wave that have not reached the put wall yet may be calculated. In block 1008 the processor may determine transit times for items in the pending batch to reach the put wall. The time needed for each item of the pending batch or wave to reach the put wall from their inventory locations may also be calculated based on the speed of pieces of material handling equipment in the distribution center (such as conveyor speeds) and the route to the put wall. In block 1010 the processor may determine the estimated available cubby percentage based at least in part on the in-process batch items in transit and the transit times to reach the assigned cubbies of the put wall and the transit time for items in the pending batch to reach the put wall. For example, based on the transit time for the items of the current batch or wave the number of cubbies that become available before the first item of the pending batch would reach the vicinity of the put wall may be determined. This estimated number of available cubbies when the first item of the pending batch would reach the vicinity of the put wall may be used to determine the estimated available cubby percentage by dividing the number by the total number of cubbies.

In determination block 1012 the processor may determine whether the estimated available cubby percentage supports releasing the pending batch. As an example, the processor may compare the estimated available cubby percentage to a batch release threshold to determine whether the batch release threshold is met or exceeded indicating the estimated available cubby percentage supports release of the batch. For example, the batch release threshold may be a percentage value selected based on the speed of the conveyors in the distribution center, size of batches, etc. The batch release threshold may be user selectable and may be adjustable, for example based on current operating conditions in the distribution center. The batch release threshold against which the estimated available cubby percentage may be compared may be the same or different than the batch release threshold against which the current available cubby percentage may be compared. In response to determining the estimated available cubby percentage does not support release of the batch (i.e., determination block 1006="No"), in block 1002 the processor may again determine the current available cubby percentage. In this manner, the pending batch may not be released until the current available cubby percentage or estimated available cubby percentage support batch release. In response to determining the estimated available cubby percentage supports release of the batch (i.e., determination block 1006="Yes"), as described above in block 208 the processor may release the pending batch and send pick commands for items of the batched orders without assigning cubbies.

Figure 11:
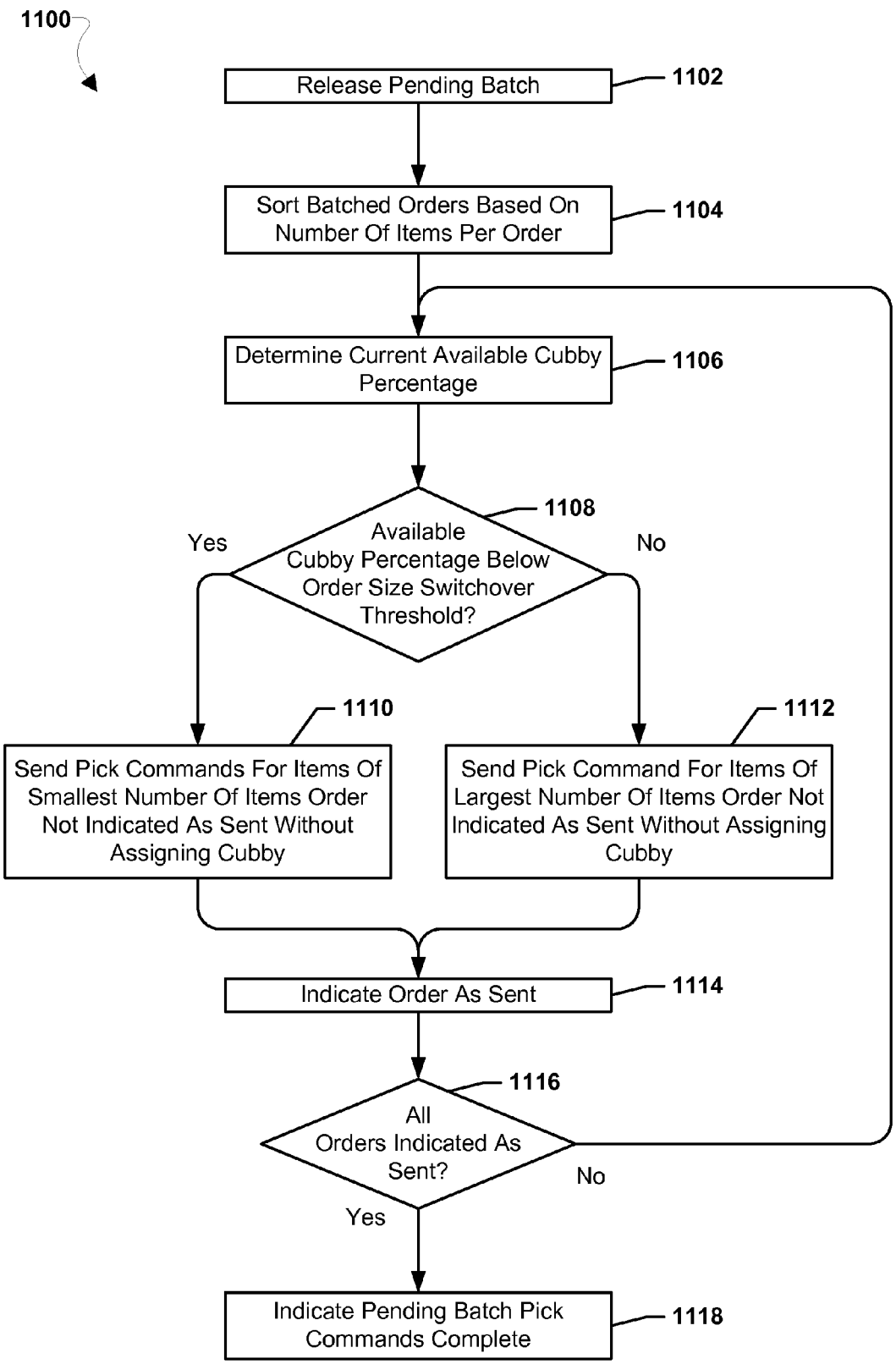
FIG. 11 is a process flow diagram illustrating an embodiment method for sending a pick command for each item of each order of a batch in response to releasing the batch.

FIG. 11 illustrates an embodiment method 1100 for sending a pick command for each item of each order of a batch in response to releasing the batch. In an embodiment, the operations of method 1100 may be performed by a processor of a computing device, such as a processor of a distribution center server. In an embodiment, the operations of method 1100 may be performed in conjunction with the operations of methods 200, 400, 700, 900, and/or 1000 described above.

In block 1102 the processor may release the pending batch without cubbies assigned. Releasing a pending batch may include sending one or more indications of orders within the batch, such as a data structure including the information for the orders, to a picking module which may control material handling equipment to enable items for orders to be picked. In block 1104 the processor may sort the batched orders based on the number of items per order. For example, orders may be sorted from largest to smallest number of items or smallest to largest number of items. In block 1106 the processor may determine the available cubby percentage. In an embodiment, the available cubby percentage may be determined as the number of available cubbies over the number of total cubbies in the put wall. As an example, the available cubbies may be identified based on a cubby assignment table as described above.

In determination block 1108 the processor may determine whether the available cubby percentage is below an order size switchover threshold. In an embodiment, an order size switchover threshold may be a value selected to control whether smaller orders or larger orders are picked and sent toward the put wall. The order size switchover threshold may be user selectable and may be adjustable, for example based on current operating conditions in the distribution center. As an example, when the available cubby percentage is below the order size switchover threshold order with less items compared to the rest of the batch may be selected to be picked. Because these items have relatively less orders the items may take relatively less time to consolidate at the put wall than other orders of the batch, thereby freeing up cubbies at a faster pace than orders with higher numbers of items. When the available cubby percentage is at or above the order size switchover threshold there may be more available cubbies and orders of the batch with relatively more numbers of items may be picked because the number of available cubbies may support the relatively longer period of time needed to consolidate these relatively larger item orders without impacting order processing (e.g., without causing wait times for cubbies to become available).

In response to determining the available cubby percentage is below the order size switchover threshold (i.e., determination block 1108="Yes"), in block 1110 the processor may send pick commands for items of the smallest number of items order not indicated as sent without assigning a cubby to that order. In response to determining the available cubby percentage is at or above the order size switchover threshold (i.e., determination block 1108="No"), in block 1112 the processor may send pick commands for items of the largest number of items order not indicated as sent without assigning a cubby to that order. In block 1114 the processor may indicate whichever order pick commands were sent for in blocks 1110 or 1112 as being sent. For example, a data structure, such as a batch table, may be updated to indicate that order was sent. In determination block 1116 the processor may determine whether all orders are indicated as sent. In response to determining all orders are not indicated as sent (i.e., determination block 1116="No"), in block 1106 the processor may again determine the current available cubby percentage. Once all orders are indicated as sent (i.e., determination block 1116="Yes"), in block 1118 the processor may indicate the pending batch pick commands as completed.

Figure 12:
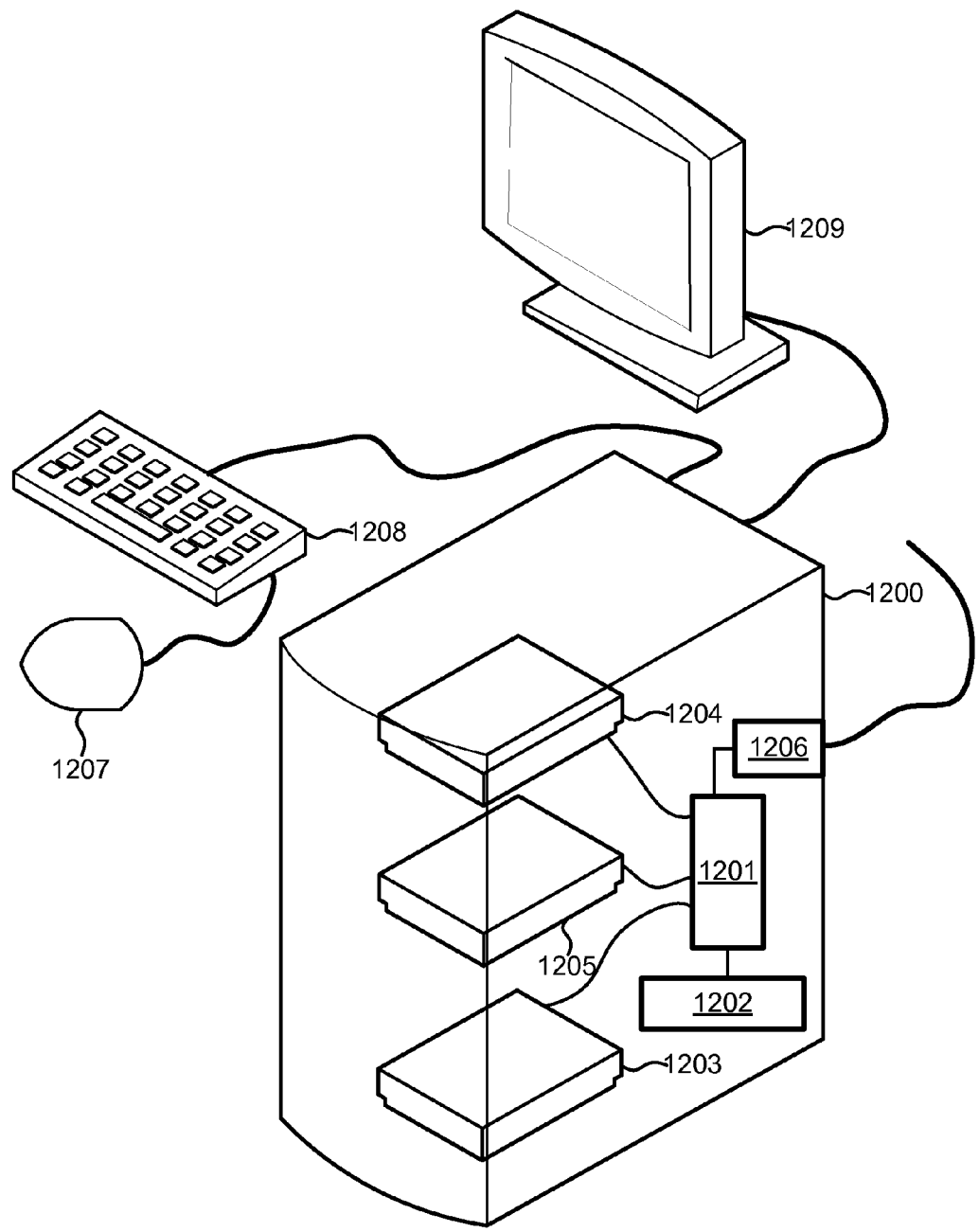
FIG. 12 is a component diagram of an example computing device suitable for use with the various embodiments.

The various embodiments may be implemented in any of a variety of computing devices, an example of which is illustrated in FIG. 12. A computing device 1200 will typically include a processor 1201 coupled to volatile memory 1202 and a large capacity nonvolatile memory, such as a disk drive 1205 of Flash memory. The computing device 1200 may also include a floppy disc drive 1203 and a compact disc (CD) drive 1204 coupled to the processor 1204. The computing device 1200 may also include a number of connector ports 1206 coupled to the processor 1201 for establishing data connections or receiving external memory devices, such as a USB or FireWire® connector sockets, or other network connection circuits for establishing network interface connections from the processor 1201 to a network or bus, such as a local area network coupled to other computers and servers, the Internet, the public switched telephone network, and/or a cellular data network. The computing device 1200 may also include the trackball 1207, keyboard 1208 and display 1209 all coupled to the processor 1201.

Figure 13:
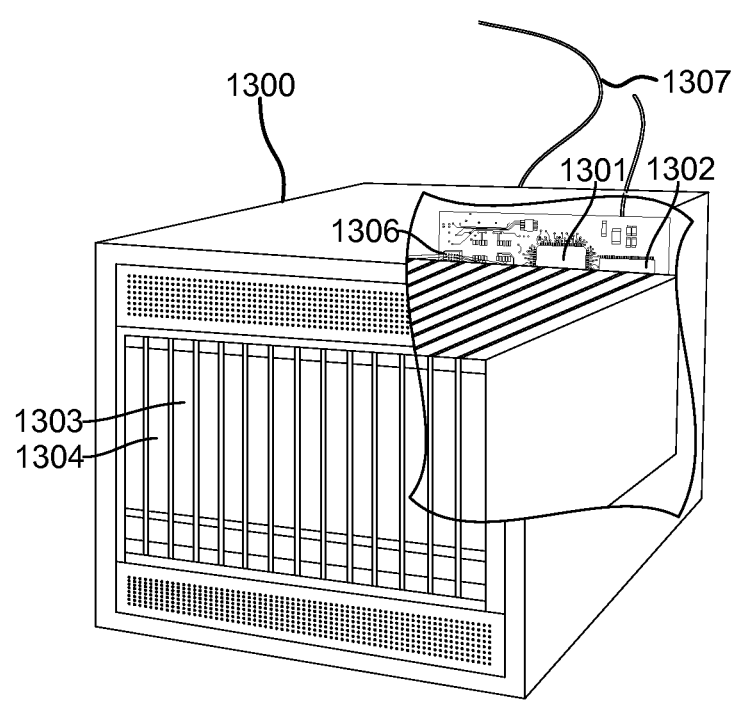
FIG. 13 is a component diagram of an example server suitable for use with the various embodiments.

The various embodiments may also be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1304 coupled to the processor 1301. The server 1300 may also include network access ports 1306 coupled to the processor 1301 for establishing network interface connections with a network 1307, such as a local area network coupled to other computers and servers, the Internet, the public switched telephone network, and/or a cellular data network.

The processors 1201 and 1301 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1202, 1205, 1302, and 1303 before they are accessed and loaded into the processors 1201 and 1301. The processors 1201 and 1301 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1201 and 1301 including internal memory or removable memory plugged into the device and memory within the processor 1201 and 1301 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for operating a put wall of a material handling system, comprising:
    generating, by a distribution center server, a batch of one or more orders each having one or more items without assigning any cubbies of the put wall for the one or more orders, wherein the batch exceeds currently available cubbies of the put wall;
    sending, by the distribution center server to material handling equipment, a pick command for each item of each order of the batch;
    controlling, by the distribution center server, the material handling equipment to move the one or more items of the one or more orders of the batch to the put wall;
    moving, by the material handling equipment, the one or more items of the one or more orders of the batch to the put wall;
    detecting, by one or more scanners in communication with the distribution center server, a first item of a first order of the batch in a vicinity of the put wall;
    determining, by the distribution center server, available cubbies of the put wall in response to detecting the first item of the first order of the batch in the vicinity of the put wall, wherein at least one cubby became available for reuse during movement of the batch by the material handling equipment;
    dynamically selecting, by the distribution center server, one of the available cubbies;
    assigning, by the distribution center server, the selected cubby to all of the one or more items of the first order; and
    sending, by the distribution center server to a controller of the put wall, an indication that the selected cubby is the assigned cubby for all of the one or more items of the first order.

2. The method of claim 1, further comprising:
    indicating, by the distribution center server, the selected cubby as unavailable in response to assigning the selected cubby to all of the one or more items of the first order; and
    sending, by the distribution center server to the controller of the put wall, a put indication for the first item.

3. The method of claim 2, further comprising:
    determining, by the distribution center server, that all of the one or more items of the first order are put in the selected cubby; and
    indicating, by the distribution center server, the selected cubby as available in response to determining that all of the one or more items of the first order are put in the selected cubby.

4. The method of claim 1, wherein the put wall comprises at least one of: (i) a radio frequency directed put wall; (ii) a light directed put wall; (iii) an eye display directed put wall; and (iv) a voice directed put wall.

5. The method of claim 1, wherein selecting, by the distribution center server, one of the available cubbies comprises:
    sorting, by the distribution center server, the available cubbies based on priority attributes of the available cubbies; and
    selecting, by the distribution center server, a highest priority cubby of the available cubbies.

6. The method of claim 5, wherein the priority attributes are based at least in part on a put wall employee efficiency metric.

7. The method of claim 6, wherein the put wall employee efficiency metric is a travel distance from an item delivery point to each cubby.

8. The method of claim 1, wherein controlling, by the distribution center server, the material handling equipment to move the one or more items of the batch to the put wall comprises:
    determining, by the distribution center server, a current available cubby percentage of the put wall in response to generating the batch;
    determining, by the distribution center server, whether the current available cubby percentage supports release of the batch; and
    controlling, by the distribution center server, the material handling equipment to move the batch in response to determining the current available cubby percentage supports release of the batch.

9. The method of claim 8, further comprising in response to determining by the distribution center server, the current available cubby percentage does not support release of the batch:
    determining, by the distribution center server, in-process items in transit and transit times for the in-process items to reach their assigned cubbies of the put wall;
    determining, by the distribution center server, transit times for the one or more items of the one or more orders of the batch to reach the put wall in response to determining the current available cubby percentage does not support release of the batch;

determining, by the distribution center server, an estimated available cubby percentage based at least in part on the determined in-process items in transit, the determined transit times for the in-process items to reach their assigned cubbies of the put wall, and the determined transit times for the items of the batch to reach the put wall;

determining, by the distribution center server, whether the estimated available cubby percentage supports release of the batch; and controlling, by the distribution center server, the material handling equipment to move the batch in response to determining the estimated available cubby percentage supports release of the batch.

10. The method of claim 1, wherein sending, by the distribution center server to the material handling equipment, the pick command for each item of each order of the batch comprises:

sorting, by the distribution center server, the batch based on a number of items per order;

determining, by the distribution center server, a current available cubby percentage of the put wall in response to sorting the batch;

determining, by the distribution center server, whether the current available cubby percentage is below an order size switchover threshold;

sending, by the distribution center server to the material handling equipment, a pick command for an order with a smallest number of items per order in response to determining the current available cubby percentage is below the order size switchover threshold; and sending, by the distribution center server to the material handling equipment, a pick command for an order with a largest number of items per order in response to determining the current available cubby percentage is not below the order size switchover threshold.

11. The material handling system of claim 1, wherein material handling equipment comprises at least one of a conveyor and a cart.

12. A material handling system comprising:

material handling equipment configured to move one or more items;

a scanner configured to detect one or more items;

a put wall comprising a controller and one or more cubbies;

a network interface in communication with the scanner, the material handling equipment, and the controller of the put wall;

a distribution center server, comprising a processor connected to the network interface, wherein the processor is configured with processor executable instructions to perform operations comprising:

generating a batch of one or more orders each having one or more items without assigning any cubbies of the put wall for the one or more orders, wherein the batch exceeds currently available cubbies of the put wall;

sending, to the material handling equipment, a pick command for each item of each order of the batch;

controlling the material handling equipment to move the one or more items of the one or more orders of the batch to the put wall;

receiving, from the scanner, a first indication that a first item of a first order of the batch is detected in a vicinity of the put wall;

determining, based on the first indication, when the first item of the first order of the batch is detected in the vicinity of the put wall;

determining available cubbies of the put wall in response to determining the first item of the first order is detected in the vicinity of the put wall, wherein at least one cubby became available for reuse during movement of the batch by the material handling equipment;

selecting one of the available cubbies;

assigning the selected cubby to all of the one or more items of the first order; and sending, to the controller of the put wall, a second indication that the selected cubby is the assigned cubby for all of the one or more items of the first order.

13. The material handling system of claim 12, wherein the processor is configured with processor executable instructions to perform operations further comprising:

indicating the selected cubby as unavailable in response to assigning the selected cubby to all of the one or more items of the first order; and sending, to the controller of the put wall a put indication for the first item.

14. The material handling system of claim 13, wherein the processor is configured with processor executable instructions to perform operations further comprising:

determining that all of the one or more items of the first order are put in the selected cubby; and indicating the selected cubby as available in response to determining that all of the one or more items of the first order are put in the selected cubby.

15. The material handling system of claim 12, wherein the put wall comprises at least one of: (i) a radio frequency directed put wall; (ii) a light directed put wall; (iii) an eye display directed put wall; and (iv) a voice directed put wall.

16. The material handling system of claim 12, wherein the processor is configured with processor executable instructions to perform operations such that selecting one of the available cubbies comprises: sorting the available cubbies based on priority attributes of the available cubbies; and selecting a highest priority cubby of the available cubbies.

17. The material handling system of claim 16, wherein the priority attributes are based at least in part on a put wall employee efficiency metric.

18. The material handling system of claim 17, wherein the put wall employee efficiency metric is a travel distance from an item delivery point to each cubby.

19. The material handling system of claim 12, wherein controlling material handling equipment to move the one or more items of the batch to the put wall comprises:

determining a current available cubby percentage of the put wall in response to generating the batch;

determining whether the current available cubby percentage supports release of the batch; and controlling the material handling equipment to move the batch in response to determining the current available cubby percentage supports release of the batch.

20. The material handling system of claim 19, wherein the processor is configured with processor executable instructions to perform operations further comprising in response to determining the current available cubby percentage does not support release of the batch:

determining in-process items in transit and transit times for the in-process items to reach their assigned cubbies of the put wall;

determining transit times for the one or more items of the one or more orders of the batch to reach the put wall in response to determining the current available cubby percentage does not support release of the batch;

determining an estimated available cubby percentage based at least in part on the determined in-process items in transit, the determined transit times for the in-process items to reach their assigned cubbies of the put wall, and the determined transit times for the items of the batch to reach the put wall;

determining whether the estimated available cubby percentage supports release of the batch; and controlling the material handling equipment to move the batch in response to determining the estimated available cubby percentage supports release of the batch.

21. The material handling system of claim 12, wherein the processor is configured with processor executable instructions to perform operations such that sending a pick command for each item of each order of the batch comprises:

sorting the batch based on a number of items per order;

determining a current available cubby percentage of the put wall in response to sorting the batch;

determining whether the current available cubby percentage is below an order size switchover threshold;

sending, to the material handling equipment, a pick command for an order with a smallest number of items per order in response to determining the current available cubby percentage is below the order size switchover threshold; and sending, to the material handling equipment, a pick command for an order with a largest number of items per order in response to determining the current available cubby percentage is not below the order size switchover threshold.

22. The material handling system of claim 12, wherein the material handling equipment comprises at least one of a conveyor and a cart.

23. A non-transitory processor readable medium having stored thereon processor executable instructions configured to cause a processor of a distribution center server to perform operations, comprising:

generating a batch of one or more orders each having one or more items without assigning any cubbies of a put wall for the one or more orders, wherein the batch exceeds currently available cubbies of the put wall;

sending, to material handling equipment, a pick command for each item of each order of the batch;

controlling the material handling equipment in communication with the processor of the distribution center server to move the one or more items of the one or more orders of the batch to the put wall;

receiving, from one or more scanners in communication with the processor of the distribution center server, an indication that a first item of a first order of the batch is detected in a vicinity of the put wall;

determining available cubbies of the put wall in response to receiving the indication that the first item of the first order of the batch is detected in the vicinity of the put wall, wherein at least one cubby became available for reuse during movement of the batch by the material handling equipment;

selecting one of the available cubbies; and assigning the selected cubby to all of the one or more items of the first order; and sending, to a controller of the put wall, an indication that the selected cubby is the assigned cubby for all of the one or more items of the first order.

24. The non-transitory processor readable medium of claim 23, wherein the processor executable instructions are configured to cause the processor to perform operations further comprising:

indicating the selected cubby as unavailable in response to assigning the selected cubby to all of the one or more items of the first order; and sending, to the controller of the put wall, a put indication for the first item.

25. The non-transitory processor readable medium of claim 24, wherein the processor executable instructions are configured to cause the processor to perform operations further comprising:

determining that all of the one or more items of the first order are put in the selected cubby; and indicating the selected cubby as available in response to determining that all of the one or more items of the first order are put in the selected cubby.

26. The non-transitory processor readable medium of claim 23, wherein the processor executable instructions are configured to cause the processor to perform operations such that sending, to the controller of the put wall, the indication that the selected cubby is the assigned cubby for all of the one or more items of the first order comprises: sending the indication to the put wall comprising at least one of: (i) a radio frequency directed put wall; (ii) a light directed put wall; (iii) an eye display directed put wall; and (iv) a voice directed put wall.

27. The non-transitory processor readable medium of claim 23, wherein the processor executable instructions are configured to cause the processor to perform operations such that selecting one of the available cubbies comprises:

sorting the available cubbies based on priority attributes of the available cubbies; and selecting a highest priority cubby of the available cubbies.

28. The non-transitory processor readable medium of claim 27, wherein the processor executable instructions are configured to cause the processor to perform operations such that the priority attributes are based at least in part on a put wall employee efficiency metric.

29. The non-transitory processor readable medium of claim 28, wherein the processor executable instructions are configured to cause the processor to perform operations such that the put wall employee efficiency metric is a travel distance from an item delivery point to each cubby.

30. The non-transitory processor readable medium of claim 23, wherein the processor executable instructions are configured to cause the processor to perform operations such that controlling the material handling equipment to move the one or more items of the batch to the put wall comprises:

determining a current available cubby percentage of the put wall in response to generating the batch;

determining whether the current available cubby percentage supports release of the batch; and controlling the material handling equipment to move the batch in response to determining the current available cubby percentage supports release of the batch.

31. The non-transitory processor readable medium of claim 30, wherein the processor executable instructions are configured to cause the processor to perform operations further comprising in response to determining the current available cubby percentage does not support release of the batch:

determining in-process items in transit and transit times for the in-process items to reach their assigned cubbies of the put wall;

determining transit times for the one or more items of the one or more orders of the batch to reach the put wall in response to determining the current available cubby percentage does not support release of the batch;

determining an estimated available cubby percentage based at least in part on the determined in-process items in transit, the determined transit times for the in-process items to reach their assigned cubbies of the put wall, and the determined transit times for the items of the batch to reach the put wall;

determining whether the estimated available cubby percentage supports release of the batch; and controlling the material handling equipment to move the batch in response to determining the estimated available cubby percentage supports release of the batch.

32. The non-transitory processor readable medium of claim 23, wherein the processor executable instructions are configured to cause the processor to perform operations such that sending the pick command for each item of each order of the batch comprises:

sorting the batch based on a number of items per order;

determining a current available cubby percentage of the put wall in response to sorting the batch;

determining whether the current available cubby percentage is below an order size switchover threshold;

sending, to the material handling equipment, a pick command for an order with a smallest number of items per order in response to determining the current available cubby percentage is below the order size switchover threshold; and sending, to the material handling equipment, a pick command for an order with a largest number of items per order in response to determining the current available cubby percentage is not below the order size switchover threshold.

33. The non-transitory processor readable medium of claim 23, wherein the material handling equipment comprises at least one of a conveyor and a cart.

* * * * *